United States Patent [19]

Adams et al.

[11] Patent Number: 4,630,051

[45] Date of Patent: Dec. 16, 1986

[54] IMAGING DOPPLER INTERFEROMETER

[75] Inventors: Gene W. Adams, Richmond, Utah; John W. Brosnahan, Longmont, Colo.

[73] Assignee: Holodyne Ltd., 1986, Longmont, Colo.

[21] Appl. No.: 707,498

[22] Filed: Mar. 1, 1985

[51] Int. Cl.$^4$ .................. G01S 13/89; G01S 13/52; G01S 13/06

[52] U.S. Cl. .................. 342/133; 342/192; 342/156

[58] Field of Search ............ 343/17, 5 SA, 10, 5 CM, 343/7.7, 5 FT, 11 R; 367/99, 103, 124, 125; 356/28.5

[56] References Cited

U.S. PATENT DOCUMENTS

| | | | |
|---|---|---|---|
| 3,735,399 | 5/1973 | Sletten et al. | 343/5 CM X |
| 3,909,827 | 9/1975 | Tricoles et al. | 343/17 |
| 4,068,234 | 1/1978 | O'Meara | 343/17 |
| 4,086,590 | 4/1978 | Goggins, Jr. | 343/5 CM |
| 4,546,355 | 10/1985 | Boles | 343/17 |

OTHER PUBLICATIONS

Bobrow, Elementary Linear Circuit Analysis, 1981, p. 384, CBS College Publishing.
Gardner et al, "Study of the Ionospheric D-Region Using Partial Reflections" Journal of Atmospheric and Terrestrial Physics, 1953, vol. 3, pp. 321-344.
Röttger, "Investigations of Lower and Middle Atmosphere Dynamics with Spaced Antenna Drifts Radars", Journal of Atmospheric and Terrestrial Physics, vol. 43, No. 4, pp. 277-292.
Jones, "Keeping Track of Radio Echoes from the D-Region" Journal of Atmospheric and Terrestrial Physics, vol. 44, No. 1, pp. 55-60.
Austin et al, "The Phase of Waves Partially Reflected from the Lower Ionosphere" Journal of Atmospheric and Terrestrial Physics, 1964, vol. 31, pp. 1099-1106.
Lai et al, "The Determination of the Direction of Arrival of an Interference Field", Radio Science, vol. 16, No. 3, pp. 365-376.
Farley et al, "Radar Interferometry: A New Technique for Studying Plasma Turbulence in the Ionosphere," Journal of Geophysical Research, vol. 86, No. 43, pp. 1467-1472.
Kudeki et al, "Interferometer Studies of Equatorial F Region Irregularities and Drifts" Geophysical Research Letters, vol. 8, No. 4, pp. 377-380.
Providakes et al, "First VHF Auroral Radar Interferometer Observations", Geophysical Research Letters, vol. 10, No. 5, pp. 401-404.

Primary Examiner—T. H. Tubbesing
Assistant Examiner—Mark Hellner
Attorney, Agent, or Firm—Robert C. Dorr

[57] ABSTRACT

A system for simultaneously locating a plurality of targets and distinguishing the targets from noise which utilizes phase detector techniques to generate complex voltage signals and obtain phase information. Spectral analysis is performed on the complex voltage temporal functions to generate doppler frequency functions. Both spectral phase functions and spectral amplitude functions are generated from the doppler frequency functions. Spectral phase functions are analyzed using interferometry techniques to determine if a potential target has a common locational source from returns of a plurality of sensors. A zenith angle is also generated using interferometry techniques to provide locational information of the multiple targets. Range gating and two frequency range detection methods provide high resolution range information as to the location of the targets. High resolution range information and two dimensional zenith angle information are used to provide an image of the targets.

47 Claims, 16 Drawing Figures

T~42

T~46

IMAGING DOPPLER INTERFEROMETER

BACKGROUND OF THE INVENTION

The present invention pertains generally to pulsed sounder imaging and more specifically to high resolution, three dimensional imaging of a large number of independently moving targets.

There are two broad classes of methods for generating pictures of targets arrays, i.e., optical methods and raster scanning methods. Optical imaging produces a discernible picture by receiving light signals from the entire target array simultaneously, and employs a lens to sort, or focus, the various signals to form the image. Three dimensional pictures are achieved by using either stereographic viewing systems or by employing holographic techniques. A time series of images must be viewed to obtain motion information of targets in an array using optical imaging. The closest optical analogue to the present invention is the imaging Michelson Interferometer as disclosed by G. G. Shepherd. W. A. Gault, R. A. Koehler, J. C. McConnell, K. V. Paulson, E. J. Llewellyn, C. D. Anger, L. L. Cogger, J. W. Haslett, D. R. Moorcroft and R. L. Gattinger, "Optical Doppler Imaging of the Aurora Borealis", Geophys. Res. Ltrs. of Vol. II No. 10, pp. 1003 to 1006 (1984).

Fourier transform holography techniques have been used in an attempt to image electromagnetic radiation outside of the visible spectral region, but such techniques require extensive sensor arrays.

The other method of generating images of a target array comprises raster scanning which produces a picture by scanning, or mapping, the target array. Raster scanning requires that a narrow sensor beam be formed to obtain spatial resolution. The object being imaged must then be scanned at a rate which is faster than any significant changes in movement of the object (target). Radial velocities of objects (targets) can be measured using the raster scanning system by determining the doppler frequency, but this occurs only at considerable expense in resolution.

One area of particular interest for over thirty years in locating and imaging targets had been the use of medium frequency radars to explore the middle atmosphere, as disclosed by F. F. Gardner and J. L. Pawsey, "Study of the Ionospheric D-region Using Partial Reflections," J. Atmos. Terr. Phys. 3, 321-344, 1953. Since that time, there have been a considerable number of suggestions regarding the physical source of observed weak scattering. These include single target scattering from horizontally continuous layers as disclosed by Gardner and Pawsey, supra.; J. B. Gregory, "Radio Wave Reflections From the Mesosphere," J. Geophys. Res. 66, 429-445, 1961; volume scattering from small (as compared to a fresnal zone) turbulent irregularities in the electron density as disclosed by Gardner and Pawsey, supra.; J. S. Belrose and M. J. Burke, "Study of the Lower Ionosphere Using Partial Reflection, 1. Experimental Technique and Method of Analysis," J. Geophys. Res 69, 2799-2818, 1964; W. A. Flood, "Revised Theory for Partial Reflection D-region Measurements," J. Geophys. Res. 73 (17), 5585-5598, 1968; A. H. Manson. M. W. J. Merry and R. A. Vincent, "Relationship Between the Partial Reflection of Radio Waves From the Lower Ionosphere and Irregularities as Measured by Rocket Probes," Radio Sci. 4(10), 955-958, 1969; H. A. Von Biel, "Amplitude Distributions of D-region Partial Reflections," J. Geophys. Res. 76, 8365-8367, 1971; B. Tanenbaum, J. Samuel, H. Shapiro, and J. E. Reed, "Phase-difference Distributions in a D-region Partial Reflection Experiment," Radio Sci. 8, 437-448, 1973; D. B. Newman, Jr. and A. J. Ferraro, "Sensitivity Study of the Partial Reflection Experiment," J. Geophys. Res. 78, 774-777, 1973; volume scattering from irregularities in the electron neutral collision frequency as disclosed by W. R. Piggott and E. V. Thrane, "The Effect of Irregularities in Collision Frequency on the Amplitude of Weak Partial Reflections," J. Atmos. Terr. Phys. 28, 311-314, 1966; multiple large discrete irregularities as disclosed by J. B. Gregory and A. H. Manson; "Seasonal Variations of Electron Densities Below 100 km at Mid-latitude. I. Differential Absorption Measurements," J. Atmos. Terr. Phys. 31, 683-701, 1969; G. L. Austin and A. H. Manson, "On the Nature of the Irregularities That Produce Partial Reflections of Radio Waves From the Lower Ionosphere (70-100 km)," Radio Science 4(1), 35-40, 1969; G. L. Austin, R. G. T. Bennett, and M. R. Thorpe, "The Phase of Waves Partially Reflected From the Lower Ionosphere (70-120 km)," J. Atmos. Terrest. Phys. 31, 1299-1106, 1969; D. J. Cohen and A. J. Ferraro, Modeling the D-region Partial Reflection Experiment, Radio Sci. 8, 459-465, 1973; constructive interference from fortunately spaced vertical stratifications as disclosed by T. Beer, "D-region Parameters From the Extraordinary component of Partial Reflections," Ann. Geophys. 28, 341-347, 1972; a large number of small scatters, highly dispersed horizontally but highly concentrated vertically as disclosed by J. D. Mathews, J. H. Shapiro, and B. S. Tanenbaum, "Evidence for Distributed Scattering in D-region Partial-reflection Processes," J. Geophys. Res. 78(34), 8266-8275, 1973; irregularities caused directly by gravity waves as disclosed by C. O. Hines, "Internal Atmospheric Gravity Waves at Ionospheric Heights," Can. J. Phys. 38, 1441-1481, 1960; A. H. Manson, J. B. Gregory, and D. G. Stephenson, "Winds and Wave Motions (70-100 km) as Measured By a Partial-reflection Radiowave System," J. Atmos. Terrest. Phys. 35, 2055-2067, 1973; reflections from the top and bottom of a turbulent sheer flow layer as disclosed by K. Schlegel, A. Brekke, and A. Haug, "Some Characteristics of the Quiet Polar D-region and Mesosphere Obtained With the Partial Reflection Method," J. Atmos. Terrest. Phys. 40, 205-213, 1978; P. K. Rastogi and O. Holt, "On Detecting Reflections in Presence of Scattering From Amplitude Statistics With Application to D-region Partial-reflections, Radio Sci. 16(6), 1431-1443, 1981; oscillations caused by surface, or ducted waves as disclosed by R. M. Harper and R. F. Woodman, "Preliminary Multiheight Radar Observations of Waves and Winds in the Mesosphere Over Jicamarca," J. Atmos. Terrest. Phys. 39, 959-963, 1977; interference modes of acoustic waves as disclosed by K. Schlegel, E. V. Thrane, and A. Brekke, "Partial Reflection Results in the Auroral D-region Explained in Terms of Acoustic Waves," J. Atmos Terrest. Phys. 42, 809-814, 1980; and Bragg scattering from gravity waves as disclosed by R. M. Jones and R. N. Grubb, "D-region Partial Reflection Doppler Measurements With the NOAA/MPE Digital HF Radar, Max-Planck Institut Fur Aeronomie," Rpt. No. MPAE-W-02-80-20, September 1980; R. M. Jones, G. W. Adams, and D. C. Walden, "Preliminary Partial Reflection Measurements at Brighton, Colo. on Jan. 9, 1981, NOAA Tech. Memo," ERL SEL-80, 1982. These references are specifically incorporated herein by reference for all that they disclose.

There has been considerable development in the understanding of the nature of the scattering processes. Several studies have been shown that there appear to be periodic wave patterns, rather than random patterns moving across antenna fields from E-region reflections, as disclosed by R. F. Kelleher, "Some Statistical Properties of the Ground Diffraction Patterns of Vertically Reflected Radio Waves," J. Atmos. Terrest. Phys. 28, 213–223, 1966; M. G. Golley and D. E. Rossiter, "Some Tests of Methods of Analysis of Ionospheric Drift Records Using an Array of 89 Aerials," J. Atmos. Terrest. Phys. 33, 701–714, 1971; W. Pfister, "The Wave-Like Nature of Inhomogeneities in the E-region," J. Atmos. Terrest. Phys. 33, 999–1025, 1971; and from D-region partial reflections as disclosed by M. G. Golley and D. E. Rossiter, "Some Tests of Methods of Analysis of Ionospheric Drift Records Using an Array of 9 Aerials," J. Atmos. Terrest. Phys. 3, 701–714, 1971. The specularity, or aspect sensitivity, of the scatters at medium frequencies was first noted by Gardner and Pawsey, supra. and has been studied by B. C. Lindner, "The Nature of D-region Scattering of Vertical Incidence Radiowaves I. Generalized Statistical Theory of Diversity Effects Between Spaced Receiving Antennas," Aust. J. Phys. 28, 163–170, 1975a; B. C. Lindner, "The Nature of D-Region Scattering of Vertical Incidence Radiowaves II. Experimental Observations Using Spaced Antenna Reception," Aust. J. Phys. 28, 171–184, 1975b; R. A. Vincent and J. S. Belrose, "The Angular Distribution of Radio Waves Partially Reflected From the Lower Ionosphere," J. Atmos. Terrest. Phys. 40, 35–47, 1978; K. L. Jones, "Angular Variation of Partial Reflections from the D-region Using a Steerable Beam Radar," J. Atmos. Terrest. Phys. 42, 569–575, 1979; W. K. Hocking, "Angular and Temporal Characteristics of Partial Reflections from the D-region of the Ionosphere," J. Geophys. Res. 84(A-3), 845–851, 1979; W. K. Hocking, "Investigations of the Movement and Structure of D-region Ionospheric Irregularities," Ph.D. Thesis, Physics Dept. Univ. Adelaide, Australia, 1981. The picture that has emerged from this work is that the scattering is highly specular below 75 kilometers, and most of the radar pulse is returned within a few degrees of vertical. Off-vertical scattering increases rapidly with increasing altitude, exceeding a ten degree width by 85 kilometers. Above the mesopause, the specularity has been observed to increase again. Measurements at VHF (P. Czechowsky, R. Ruster, and G. Schmidt, "Variations of Mesospheric Structures in Different Seasons," Geophys. Res. Lett. 6(6), 459–462, 1979; W. L. Ecklund and B. B. Balsley, "Long-term Observations of the Arctic Mesosphere with the MST Radar at Poker Flat, Alaska," J. Geophys. Res. 86, 7775–7780, 1981; B. B. Balsley, "The MST Technique—A Brief Review," J. Atmos, Terrest. Phys. 43(516), 495–509, 1981; J. Rottger, "Investigations of Lower and Middle Atmosphere Dynamics with Spaced Antenna Drifts Radars," J. Atmos. Terrest. Phys. 43(4) 277–292, 1981), have revealed considerable detail about the mesospheric scattering structures observed at 50 MHz. A high degree of specularity is observed at these frequencies also, except at high latitudes. The VHF results suggest a two-component scattering mechanism; one specular and sporadic, and the other isotropic and more constant in time. All of these references are specifically incorporated herein by reference for all that they disclose.

The structures that scatter medium frequency radar pulses appear to occur on scales smaller than can be resolved with a practical antenna beam so that there is no practical way of imaging the targets. For example, beam forming techniques produce a beam which is tens of kilometers wide at altitudes of 80 kilometers. Clearly, this size beam is incapable of providing sufficient resolution to image targets. Of course, the same problems exist in ultrasonic imaging and sonar imaging.

Apart from imaging, time domain interferometry techniques have been used by radio-astronomers for many years to locate distant targets such as distant stars and galaxies with a high degree of precision. Interferometry techniques are capable of determining the zenith angle to locate one specific target with high precision. The detected red shift of the target indicates its doppler frequency.

Consequently, time domain interferometry techniques have been used by radio astronomers to provide high resolution information pertaining to the zenith angle of a single target. This clearly overcomes the low-resolution problems associated with steered beams.

Pfister, J. Atmosph. Terr. Phys., 33,999 originally suggested that Fourier transformations could be performed on data reflected from targets and the phase differences compared to locate the target. This technique was attempted by D. C. Cox, N. Cianos, and A. T. Watermann, "A Technique for Obtaining the Doppler Spectrum from Sampled Amplitude-Phase Data in a Data-gathering Array," IEEE Trans. Ant. Prop. AP-18(4) 580–582, 1970, which utilized a physically steered beam and examined the Fourier transform of the returned data. Since Cox et al. utilized a physically steered beam, the resolution of the data was limited by the resolution of the physically steered beam.

The technique suggested by Pfister, supra. was later used by D. T. Farley, H. Ierkic, and B. G. Fejer for "Radar Interferometry: A New Technique for Studying Plasma Turbulence in the Ionosphere," J. Geophys. Res. 86, 1467–1472, 1981. As disclosed by Farley et al., two complex voltage signals were detected from each of two antennas from which both amplitude and phase data were derived. Interferometry techniques were then utilized by Farley et al. to locate the target by zenith angle in one dimension. Farley et al. then distinguished targets from noise by observing the data in a series of time interval returns to determine the temporal persistence of a potential target. If a potential target did not persist for several time intervals, it was determined to be noise. A three-antenna array formed in a triangle was later suggested by H. M. Ierkic and J. Rottger in "Mesospheric Measurements of Irregularity Patches Using a Three Antenna Interferometer", Proceedings, Second Workshop on Technical Aspects of MST Radar, Urbana, Ill. May 21–25, 1984. Ierkic et al. again utilized temporal persistence to distinguish targets from noise.

U.S. Pat. No. 4,172,255 issued Oct. 23, 1979 to Barrick et al. discloses an HF coastal current mapping radar system which utilizes two separate radar transmitters and receivers which look at specific points in the ocean to determine the radial velocity vector of the movement of surface currents of the ocean as a result of moving waveforms. The doppler frequency is used at each separate antenna location to determine the speed of movement of the waves. The radial velocities determined in this manner are combined trigonometrically to determine the true direction and speed of the waveforms. This provides information regarding movement of surface currents. As disclosed in FIG. 5 of the Barrick et al. patent, a particular point in the ocean is selected for investigation using the phase difference of the returned signals. This is the same technique used by Farley et al., supra, except that rather than determining a one-dimensional zenith angle, Barrick et al. determines a one-dimensional azimuth angle.

Consequently, Barrick et al. essentially performs the same techniques as disclosed by Farley et al. with the exception that a point is being selected in the azimuthal plane by Barrick et al., rather than a zenith angle, as disclosed by Farley et al. Other differences also exist between the manner in which the data is utilized. Farley et al. used the one-dimensional zenith angle data to distinguish targets from noise by recognizing the time persistence of the target over several sampling periods. The temporal persistence of the target functions to distinguish the target from noise. Barrick et al., on the other hand, is not interested in locating specified targets, but rather, locates specific points on the surface of the ocean using interferometry techniques. The selected specified point is then analyzed to determine the radial speed of the target relative to each of the two antenna locations. This information is analyzed trigonometrically to produce a vector velocity indicating the speed and direction of the wave motion.

Again, neither of these references uses a comparison of phase angles of the received data to eliminate noise. Barrick et al. merely compares phase values to select a specified point to analyze. Consequently, Barrick et al. has not even addressed the question of identifying the location of a detected target, but rather, uses interferometry techniques to select a predetermined location to be examined. Farley et al., on the other hand, relies upon temporal persistence of the target, as disclosed above, to distinguish the targets from noise. Both of these techniques rely upon data in a single plane, i.e., a zenith angle in a single plane, as disclosed by Farley et al. and an azimuth angle, as disclosed by Barrick et al.

Consequently, the prior art has failed to provide a device which is capable of generating three dimensional data with high resolution so that an image can be formed of an object. Moreover, prior art techniques have been unable to accurately distinguish noise from target data without losing temporal resolution.

SUMMARY OF THE INVENTION

The present invention overcomes disadvantages and limitations of the prior art by providing an imaging doppler interferometer which is capable of high resolution, three dimensional imaging. The present invention comprises a process for detecting targets and providing three dimensional locational information of the targets by transmitting a temporal series of pulses to illuminate the targets, detecting the temporal series of pulses reflected from the targets by at least three independent sensors, measuring the time of flight of the temporal series of pulses reflected from the targets to provide range information of the radial distance of the targets from the sensors, producing complex voltage temporal functions from the temporal series of pulses reflected from the moving targets for each of the independent sensors, transforming the complex voltage temporal functions to doppler frequency functions which vary with doppler frequencies indicative of relative movement between the targets and the sensors, generating phase values and amplitude values from the doppler frequency functions, and examining the phase values and amplitude values for each doppler frequency using interferometry techniques to confirm the spatial consistency of the targets from the simultaneous detection of the temporal series of pulses reflected from the targets by the independent sensors to thereby distinguish the targets from noise and to locate each target spatially.

The present invention may also comprise a system for simultaneously locating a plurality of targets and distinguishing the targets from noise comprising; a transmitter for transmitting a temporal series of pulses to illuminate the targets, a transducer for detecting the temporal series of pulses reflected from the targets, a phase detector for producing at least three individual sets of complex voltage temporal functions from the temporal series of pulses representative of the detection of the temporal series of pulses by the transducer at an equal number of spatially separated transducer locations, a spectral analysis device for transforming the complex voltage temporal functions to doppler frequency functions which vary with the doppler frequencies induced in the complex voltage temporal functions as a result of relative movement between the targets in the transducer, a device for generating spectral phase functions and spectral amplitude functions from the doppler frequency functions, and a device for analyzing spectral phase functions and spectral amplitude functions to distinguish the targets from noise and locate the targets by comparing differences in the phase values and the phase funcions produced at the spatially separated transducer locations as a function of spatial separation of the transducer locations such that a common locational source of the temporal series of pulses reflected from the targets can be identified for each doppler frequency at which the spectral amplitude function indicates the existence of a possible target.

The advantage of the present invention is that targets can be distinguished from noise by the simultaneous use of the individual sensors within the sensor array. Unlike prior art devices such as Farley et al., supra, and Ierkic et al., supra, which rely upon temporal persistence of a target to distinguish targets from noise, the present invention uses a single sample of data having a number of individual sensors to determine whether the signal is being returned from a common locational point. In other words, the present invention relies upon a spatial coincidence of scattering points by comparing phase values of the independent sensors simultaneously, rather than temporal persistence which relies upon identifying target in a series of time interval returns. Moreover, the present invention provides zenith angle data in two dimensions together with range (time-of-flight) data and radial movement derived from the doppler frequency. Consequently, the spatial location of multiple targets can be determined simultaneously to form images of said targets. The radial motion of the targets provides data from which the collective motion of the targets is derived.

BRIEF DESCRIPTION OF THE DRAWINGS

FIG. 13 is an example of a displacement pattern table for use with the present invention.

DETAILED DESCRIPTION OF THE INVENTION

Figure 1:
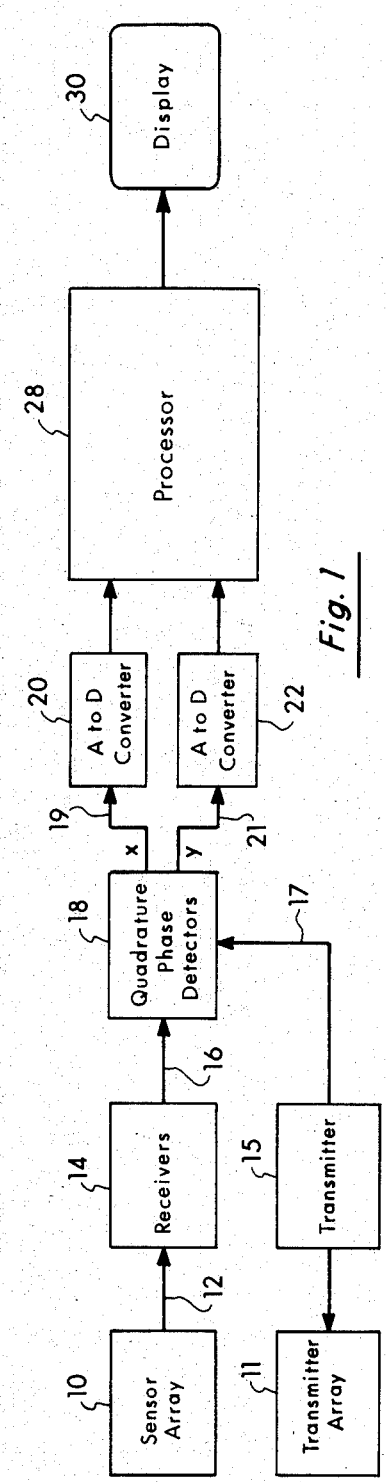
FIG. 1 is a schematic block diagram of the system of the present invention.

FIG. 1 schematically illustrates, in a block diagram form, the primary components of the present invention. The transmitter array 11 is used to transmit a time series of pulses via transmitter 15. The sensor array 10 functions to detect the time series of pulses reflected from the target. In certain applications, the transmitter 11 and sensors 10 can comprise the same hardware, such as transmitting and receiving antennas, or separate components, such as in the case of vibrational and sound transducers and vibrational and sound transmitters. Any desired form of transmitter array 11 or sensor array 10 can be used which is capable of generating a time series of pulses which are capable of being detected subsequent to reflection or scattering by a target. The target which reflects the time series pulses can comprise any desired target, such as radar targets capable of partial reflections, sonar targets, ultrasound targets, laser targets, or any object which is capable of reflecting, at least partially reflecting or scattering some detectable form of a time series pulse. Additionally, the present invention can utilize sensors only if a self luminous source is being detected. Self luminous sources can take the form of a nuclear radiation generator, magnetic generator, electromagnetic radiation generator, a sound or vibrational generator, all of which are applicable for use with the present invention, as long as these sources produce a detectable signal. Consequently, the targets generally comprise anything which is capable of reflecting or scattering a time series of pulses or which is self luminous and produces detectable signals. Such signals can be in the form of sound, vibrational pulses, electromagnetic radiation, or particulate radiation and can cover a wide range of frequencies as long as they are detectable by the sensors being employed.

For example, the present invention can be utilized as a real-time wind shear detector around airports, aircraft carriers, etc. Currently available wind shear detectors can only examine a few selected spots for wind shear. This greatly limits the safety aspects of airport operations and influences take-off and landing schedules considerably. The present invention can utilize electromagnetic radiation in the frequency range of 30 to 1000 MHz, for example, to obtain images of clear air turbulence and wind shear. Acoustic sounders can also be utilized to obtain wind shear and air turbulence data. The present invention is capable of imaging from ground level to a several mile radius in all directions simultaneously. A graphical display can be produced by the present invention which illustrates the surrounding environment of an airport including air traffic, regions of clear air turbulence and wind shear.

The present invention can also be utilized to provide a surface, two dimensional, or three dimensional description of the behavior of a fluid, i.e., liquid, gas, or plasma unbounded or flowing in a pipe or channel, such as an oil pipeline, wind tunnel, or magnetic plasma chamber. Prior art techniques of flow analysis have been limited to dye tracers and strips of tissue paper on wires to analyze the flow characteristics of certain fluids. The present invention is capable of providing a three dimensional doppler image of the flow utilizing a relatively small number of sensors, e.g. 9 sensors, to characterize the flow. Furthermore, the entire transducer array can be formed into the physical structure determining the flow so that no perturbation of the flow is caused by the sensors. The present invention can also be used to map both surface and internal flow characteristics and perturbations of small and large bodies of water.

The present invention can also be used as a sonar device to generate images of submarine or geographical features in the ocean. As a sonar device for submarine imaging, the present invention can be implemented using transmitter and sensor arrays similar to existing arrays. For example, sensors can be deployed in the underwater portions of a surface ship or along the length of a submarine to achieve maximum separation. The present invention would then be capable of providing photograph-like images of underwater terrain and underwater objects such as submarines.

The present invention is also useful in swarm tracking and imaging since it is capable of generating individual doppler images of a plurality of independently moving targets. Consequently, it is directly applicable to use in following elements of swarms, such as flocks of birds, bees, or a large number of targets, such as missiles or airplanes.

The present invention can also be utilized for three dimensional imaging in medicine and dentistry using ultra-sonics to achieve a resolution comparable to x-rays. X-ray imaging produces considerable apprehension and concern by patients because of the health hazards associated with ionizing electromagnetic radiation. Ultra-sonic techniques provide a safe alternative, but to date, have been unable to provide a resolution sufficient to be of interest to the medical and dental profession. The present invention, however, achieves resolution comparable to x-rays with ultra-sonic techniques and is capable of providing three-dimensional images which cannot be produced by prior art x-ray techniques. The present invention has particular application in dental imaging since repetitive exposure of the brain to x-rays is of special concern. Furthermore, because x-rays are limited by the viewing angle which can be achieved, the present invention is particularly useful in providing a wide range of selectable viewing angles. The present invention could be implemented as five rows of 120 transducers which are placed to make physical contact around either the upper or lower jaw. The application of the present invention to dental medicine would eliminate the dangers associated with x-rays, while simultaneously providing three-dimensional image information which has not been achievable in the prior art.

Similarly, radiation flux from fluoroscopy can be eliminated using the present invention. The present invention can be used as a medical tool in a manner similar to a fluoroscope to view an image of an internal body part as it is moved and manipulated by the patient. This would allow doctors to view internal body portions of a patient with a completely safe office diagnostic tool rather than a somewhat hazardous hospital diagnostic tool.

The present invention can also be used in materials testing to examine the interior of a solid body for defects, cracks, thickness uniformity, etc. Prior art techniques of material testing normally utilize x-rays. The present invention can be utilized to examine structural features, such as welds, in a manner which achieves the resolution afforded by x-ray techniques. For example, pipeline welds can be examined using ultrasonic arrays formed to make physical contact with the circumference of the pipe.

In each of these cases, the sensors 10 produce a complex voltage signal V(t) which is applied to receivers 14 via connector 12. Receivers 14 function to amplify the complex voltage signals produced by sensors 10. In accordance with the present invention, a separate complex voltage signal is produced for each sensor element of the sensor array 10. Each of these complex voltage signals is individually amplified by receivers 14.

These individually amplified complex voltage signals are then applied to quadrature phase detectors 18 which function to separate the quadrature components of the complex voltage signal into an in-phase quadrature component x(t) and a 90 degree quadrature component y(t), hereinafter referred to as the in-phase and quadrature components. This is accomplished by multiplying the sensed signal with the in-phase version of the transmitted signal to obtain the in-phase component x(t), and also multiplying the sensed signal by a 90 degrees phase-shifted version of the transmitted signal to produce the quadrature component y(t). The in-phase signal x(t), and the quadrature component y(t) are referred to as the quadrature phase signals or time domain quadrature signals. The quadrature phase signals are applied to analog-to-digital (A to D) converters 20 and 22 via connectors 19, 21, to D converters 20, 22 convert the analog quadrature phase signals to digital signals which are applied to processor 28 which performs a plurality of functions to the time domain quadrature signals to produce a two or three dimensional display of data on display 30.

Figure 2:
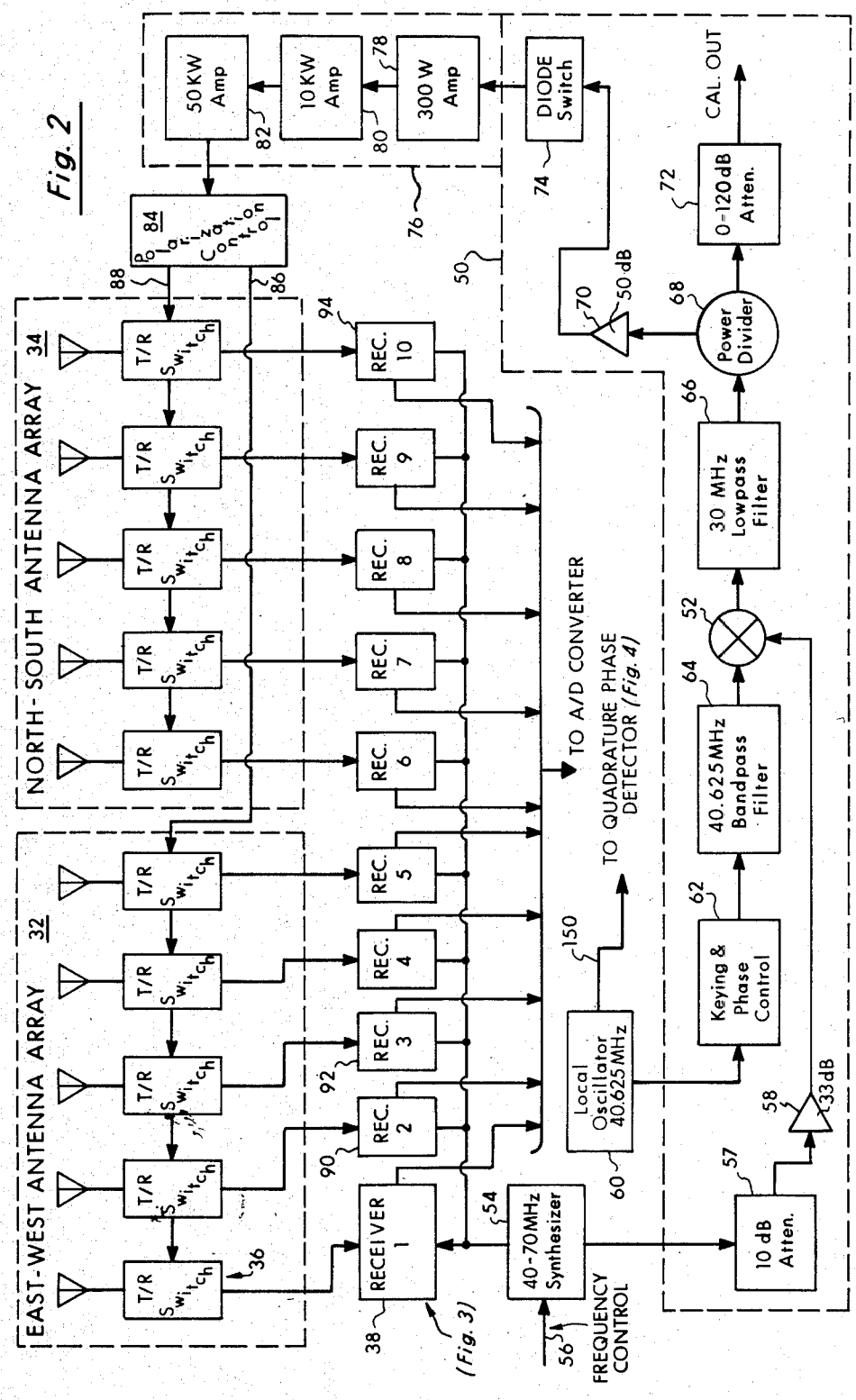
FIG. 2 is a detailed schematic block diagram of the antenna arrays, transmission and drive module, pulsed amplifier stages, receiver circuit array, polarization control, synthesizer and local oscillator of the present invention.
Figure 3:
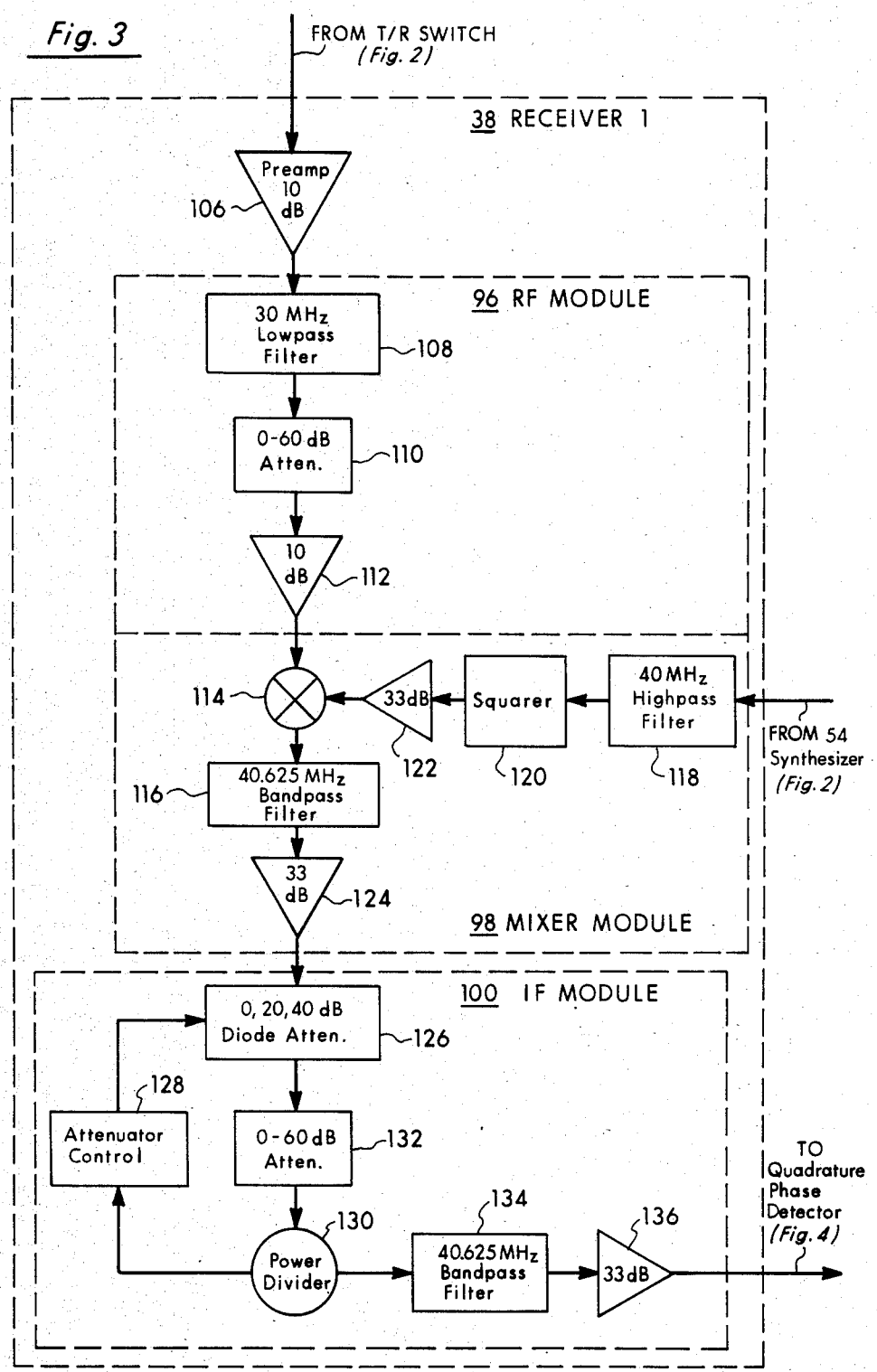
FIG. 3 is a detailed block diagram of a receiver circuit used in the present invention.
Figure 4:
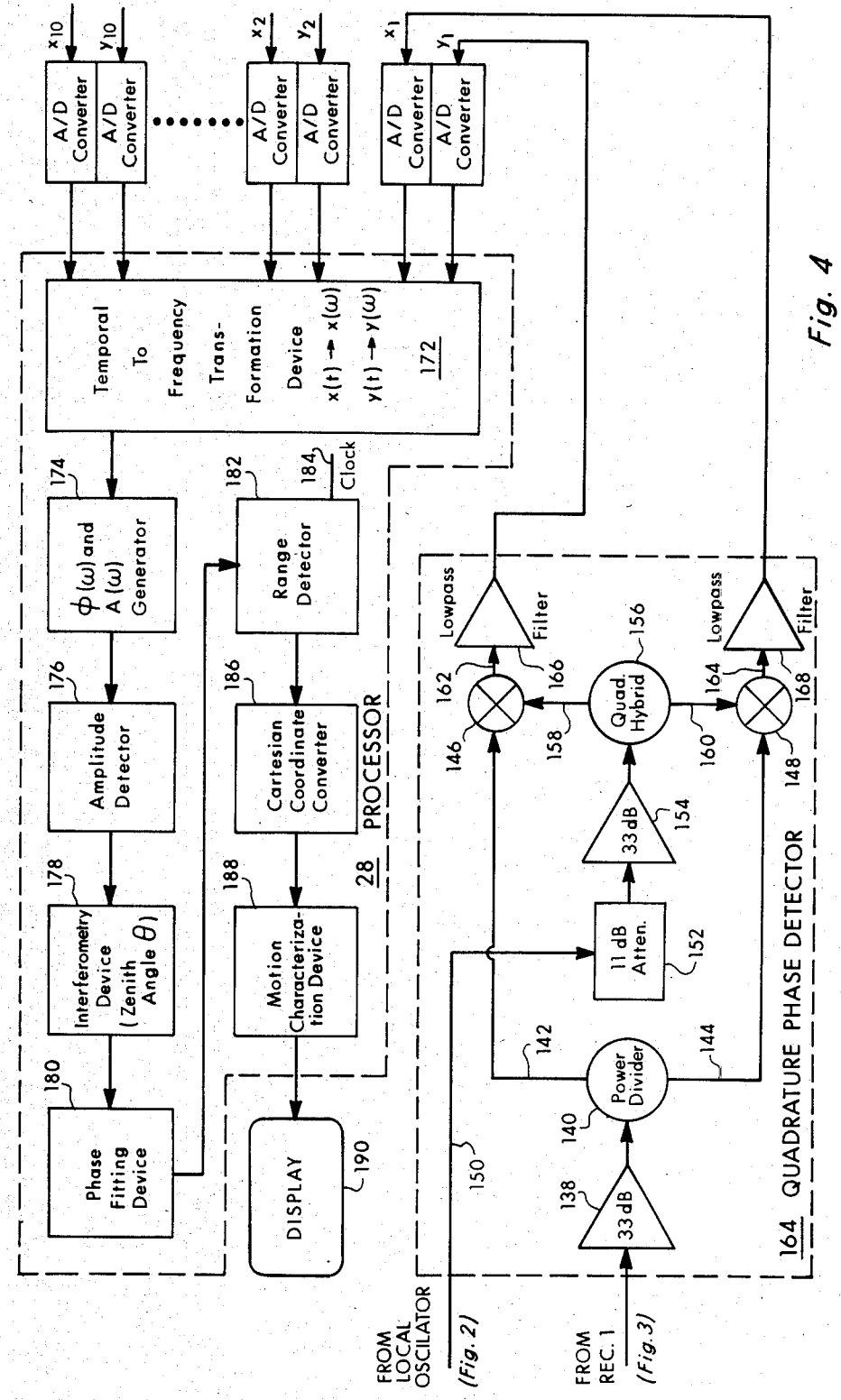
FIG. 4 is a detailed block diagram of a quadrature phase detector, processor and A/D converters.
Figure 5:
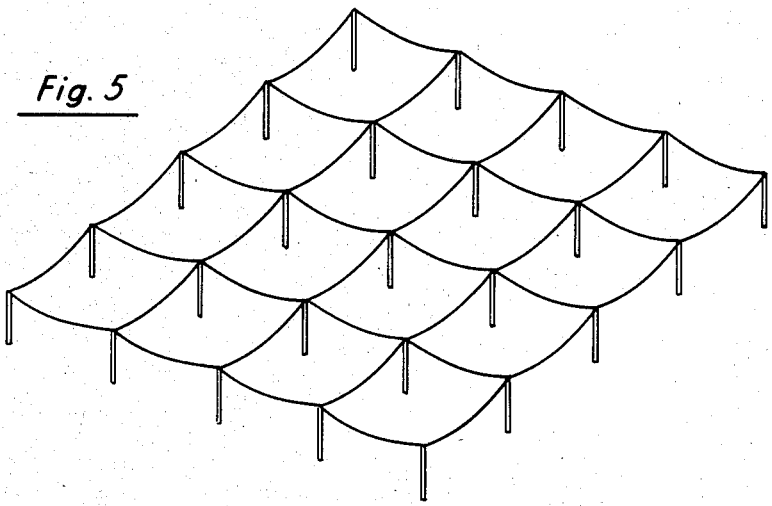
FIG. 5 is a schematic illustration of an antenna array which can be utilized with the present invention.

FIG. 2 is a detailed block diagram of the antenna array, transmission and drive module, pulsed amplifier stages, receiver circuit array, synthesizer and local oscillator of the present invention. Portions of an HF radar system similar to that disclosed in FIGS. 2, 3 and 4 is set forth in Grubb, R. N., "The NOAA SEL HF Radar System (Ionospheric Sounder)," NOAA Technical Memo No. ERL SEL-55, October 1979. The present invention has been implemented as a radar imaging device for performing mesopheric observations using a 2.66 MHz radar which was operated at the "Boot Lake Field Site" 10 miles east of Brighton, Colo. The particular sensor/transmitter array utilized took the form of an array, as illustrated in FIG. 5, which comprised ten independent coaxial, collinear antennas as described in B. B. Balsley and W. L. Ecklund, "A Portable Coaxial Collinear Antenna," IEEE Trans. Ant. Prop., AP-20(4), 513–516, 1972, having an east-west antenna array 32 which comprises five parallel antennas running in an east-west direction, and a north-south antenna array which comprises five parallel antennas running in a north-south direction. Each antenna consists of eight half-wave dipoles connected end to end with a 180 degree phase reverse at each junction to give the appearance of a length of coaxial cable with periodic splices. All ten antennas are used as a unit for transmission but are used separately for reception. In the actual experimental setup, only two receiver channels were used, for cost considerations, so that reception sampling was performed in pairs and in rapid sequence along the antenna array. Transmit/receive switches 36 were utilized to control the sampling of data. The longitudinal and transverse antenna spacings in the experiment were 0.33 of the wavelength ($\lambda$) and 0.707 of a wavelength, respectively. The transmitted beam was 28 degrees wide and all ten antennas were used.

For the experimental device, pulses were transmitted at 50 pulses per second with a four pulse coherent integration at each antenna-pair before recording the data and moving on to the next antenna pair, i.e., the data was averaged over four pulses to get one data point. The full antenna array illustrated in FIG. 5 was used in-phase for transmission so that a 45 degree linear polarization was transmitted. The data was sampled by taking 50 range gates with three kilometer spacing for each of the ten antennas. A single complete frame of data required 0.4 seconds.

Figure 6:
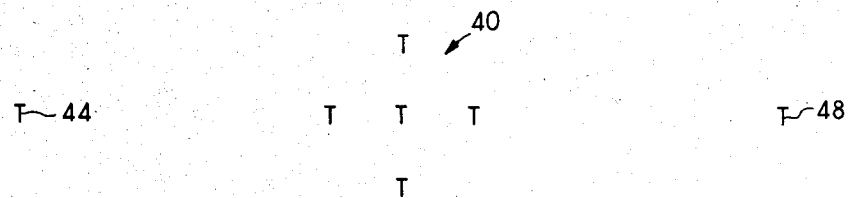
FIG. 6 is a schematic illustration of another antenna array which can be utilized with the present invention.

The transverse spacing gives grating lobes at plus or minus 45 degrees to the zenith, i.e., scatterers that lie within 45 degrees of the horizontal are aliased into zenith angles of 24.5 degrees minus 45 degrees. This means scatterers located beyond 24.5 degrees of the zenith in either plane are ambiguous, but that scatterers within 24.5 degrees of zenith are not and a more conventional spacing of a half of a wavelength, rather than 0.707 of a wavelength, would eliminate the region of ambiguity at the expense of some degradation in resolution of the antenna array illustrated in FIG. 5. However, this can be overcome by the antenna array illustrated in FIG. 6 wherein the central detectors 40 provide unambiguous data as to location since they are located with respect to one another within $\frac{1}{2}$ wavelength, while detectors 42, 44, 46, 48 provide high resolution information. Transmission and reception nulls associated with sidelobes are present, but these only introduce blind spots, rather than ambiguities into the imaging process. Consequently, the ambiguities that are normally prevalent in beam steering devices due to sidelobes are not present in the detected data of the present invention.

Most medium frequency experiments make use of the birefringency due to free electrons in the atmosphere, which causes right hand and left hand circularly polarized waves to propagate differently. The analysis method of the present invention is insensitive to this phenomenon. While birefringency can be studied using the amplitudes and phases of the individual scattering points detected in accordance with the present invention, it is not a factor in the imaging process itself. For this reason, transmitting with linear polarization is adequate for determining images and winds. However, use of linear transmission polarization does reduce the potential return from higher altitudes by approximately 3 dB since the extraordinary half (the left hand circularly polarized signal) of the transmitted signal is strongly absorbed.

The transmitter mixer and drive module 50 produces the 2.66 MHz signal to be transmitted. The 40 to 70 MHz synthesizer 54 produces a frequency equal to 43.28 MHz which is applied to 10 dB attenuator 57 and 33 dB amplifier 58 to obtain a desired gain level. This signal is then applied to mixer 52 together with a 40.625 MHz signal produced by local oscillator 60. The local oscillator signal is applied to a keying and phase controlled device 62 and a 40.625 MHz band pass filter 64. The difference signal, which is equal to 2.66 MHz, produced by mixer 52, is then applied to a 30 MHz low pass filter 66 which passes the flow frequency 2.66 MHz signal to power divider 68.

The output of the transmitter mixer and driver module 50 is applied to a three stage pulsed amplifier 76. The first stage 78 raises the signal level to 300 watts. The second stage 80 raises the signal level to 10 kilowatts, while the third 82 raises the signal level to 50 kilowatts. The output of the three stage pulsed amplifier 76 is applied to polarization control unit 84 which splits the incoming 50 kilowatt pulses into two identical signals and then allows the phase of either or both signals to be retarded by 90 degrees by the use of delay lines. Output 86 is applied to east-west antenna array 32, while output 88 is applied to north-south antenna array 34. This allows transmission of linear, right hand circularly, or left hand circularly, polarized signals. Use of different polarization provides for different propagation through the atmosphere due to the birefringent properties of the atmosphere. Polarization control unit 84 does not pertain specifically to the imaging techniques of the present invention, but rather, allows for research to be performed on the effect of free electrons in the earth's atmosphere.

The output of the transmit/receive switches 36 are connected to the plurality of receivers 38, 90, 92, 94. As illustrated in FIG. 2, the output of each transmit/receive switch 36 is connected to a separate receiver. In the actual implementation of this experiment only two receiver circuits were utilized and the outputs of the transmit/receive switches were multiplexed between the two receiver circuits to obtain data. For the purposes of simplicity, a separate receiver circuit is illustrated for each transmit/receive switch 36. First receiver circuit 38 is illustrated in detail in FIG. 3.

As shown in FIG. 3, first receiver 38 comprises an RF module 96, a mixer module 98, an IF module 100 and a quadrature phase detector 104. The receive signal is supplied to preamp circuit 106 which amplifies the signal and applies it to RF module 96. The primary frequency of interest is 2.66 MHz. The signal is applied to a 30 MHz low-pass filter 108 within the RF module 96 which functions to filter out frequencies higher than 30 MHz. A 0-60 dB attenuator 110 and 10 dB amplifier 112 function to adjust the gain of the signal from low-pass filter 108. The output of the module is applied to a double balanced mixer module 114 together with an input from the 40-70 MHz synthesizer 54 (FIG. 2). The 40-70 MHz synthesizer 54 (FIG. 2) produces a frequency which can be adjusted by frequency control 56. The output of the double balanced mixer module 114 produces both a sum and difference frequency signal which is applied to 40.625 MHz band pass filter 116. The 40.625 MHz signal is the intermediate frequency (IF frequency) utilized in the IF module 100. The 40-70 MHz synthesizer 54 (FIG. 2) is adjusted so that the IF frequency (40.625 MHz) is equal to the difference of 2.66 MHz and the frequency of the output of synthesizer 54. In other words, synthesizer 54 produces a signal having a frequency of 43.285 MHz which is equal to 2.66 MHz (the detected frequency) plus 40.625 MHz (the IF frequency). The output of synthesizer 54 is applied to double balanced mixer 114 via 40 MHz high pass filter 118, squarer 120 and 33 dB amplifier 122, to produce an output signal of 40.625 MHz which equals the difference between 2.66 MHz (which is the desired frequency to be detected) and 43.285 MHz (which is the output of the synthesizer 54). The IF frequency of 40.625 MHz is then applied to band pass filter 116 which represents the 2.66 MHz signal which is to be detected. This signal is applied to 33 dB amplifier 124 prior to application IF module 100.

IF module 100 comprises a gain control feed-back loop consisting of diode attenuator 126, attenuator control 128, power divider 130 and 0-60 dB attenuator 132. This feed-back loop is used to provide proper attenuation to detect partial returns from atmospheric structures which vary substantially in return magnitude. This signal is applied to a 40.625 MHz band pass filter 134 and a 33 dB amplifier 136 prior to application to quadrature phase detector 104.

The intermediate frequency signal received from IF module 100 is applied to a 33 dB amplifier 138 within quadrature phase detector 104, as illustrated in FIG. 4. The output is then applied to a power divider 140 which divides the signal into two separate signals 142, 144 having equal phase. These signals are applied to double balance mixers 146, 148, respectively. Local oscillator 60 produces a signal 150 having a frequency of 40.625 MHz, which is equal to the IF frequency. This signal is applied to an 11 dB attenuator 152 and a 33 dB amplifier 154 prior to application to power divider 156. Power divider 156 comprises a quad hybrid power divider which produces 90 degree hybrid signals. In other words, outputs 158 and 160 differ in phase angle by 90 degrees. These outputs are applied to double balance mixers 146, 148 which provide sum and difference signals at outputs 162, 164. Mixer modules 146, 148 function to remove the intermediate frequency 40.625 MHz from the signal and simultaneously multiply the receiver signal by an in-phase and 90 degree phase shifted component of the transmitted signal to produce in-phase x(t) and quadrature components y(t). Low pass filters 164, 168 insure that the modulation of the original 2.66 MHz carrier signal is obtained from the output of mixer modules 146, 148. The in-phase temporal component x(t) and the quadrature temporal component y(t) from each of the quadrature phase detectors, which are connected to each of the receivers circuits, are applied to A to D converters 170. For purposes of simplicity, only one quadrature phase detector 104 has been illustrated in FIG. 4, although a separate quadrature phase detector is connected to the output of each separate receiver circuit. The quadrature phase detector 104 is further disclosed in FIG. 7. The A to D converters 170 function to transform the analog signal to a digital signal for application to processor 28.

As disclosed in FIG. 4., processor 28 comprises a plurality of components which can be implemented either in software or hardware. Processor 28 comprises a temporal to frequency transformation device which transforms the complex voltage temporal functions V(t), which consists of the in-phase component x(t) and the quadrature component y(t), to doppler frequency functions V(w) which vary with a doppler frequency (w) indicative of the relevant movement between targets in the antenna array 32, 34. The doppler frequency function V(w) is applied to a phase value and amplitude value generator 174 which generate phase values $\phi(w)$ and amplitude values A(w) from the doppler frequency functions V(w) produced in temporal to frequency transformation device 172. The functions performed by the temporal to frequency transformation device 172 and phase value and amplitude value generator 174 are more specifically disclosed in FIG. 8.

Amplitude detector 176 examines the amplitude values A(w) for each doppler frequency (w) produced by each sensor of the sensor array 32, 34 to determine if all of the sensors detect a signal response at a particular doppler frequency which is greater than a predetermined minimum threshold value. When all of the sensors indicate a response above a predetermined threshold value, phase values are examined for that doppler frequency to determine the existence of a target. The function of amplitude detector 176 is disclosed in greater detail in FIG. 10.

Figure 9:
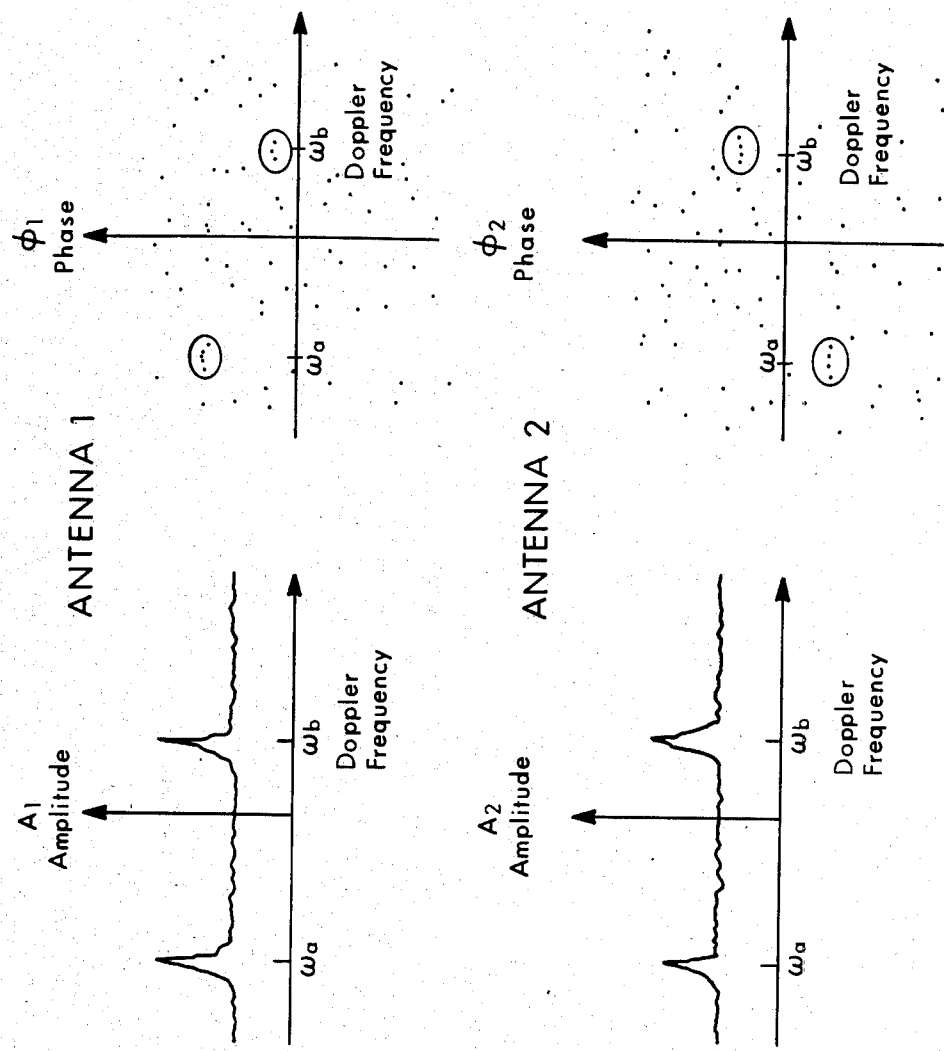
FIG. 9 is a schematic graphical depiction of signals produced in accordance with the present invention.

Interferometry device 178 utilizes interferometry techniques to determine the zenith angle $\theta$ of a target detected at a specific doppler frequency using the techniques illustrated in FIG. 9.

Phase fitting device 180 functions to fit the detected phase values for a particular doppler frequencies into one of a series of possible displacement patterns to eliminate $2\lambda$ differences in phase values. The manner in which this is achieved is disclosed in more detail in FIGS. 11, 12 and 13.

Range detector 182 selects data at a predetermined time periods delayed from the initial transmission of the time series of pulses from the transmitter 15 which represents signals received from a predetermined distance. Clock signal 184 provides the clock data necessary to determine the delay periods for selecting signals representative of returns from predetermined distances.

Cartesian coordinate converter 186 converts the zenith angle data and radial range data to Cartesian coordinate data.

Motion characterization device 188 uses mathematical techniques to describe the motion of the targets. Display 190 displays the target data.

Figure 7:
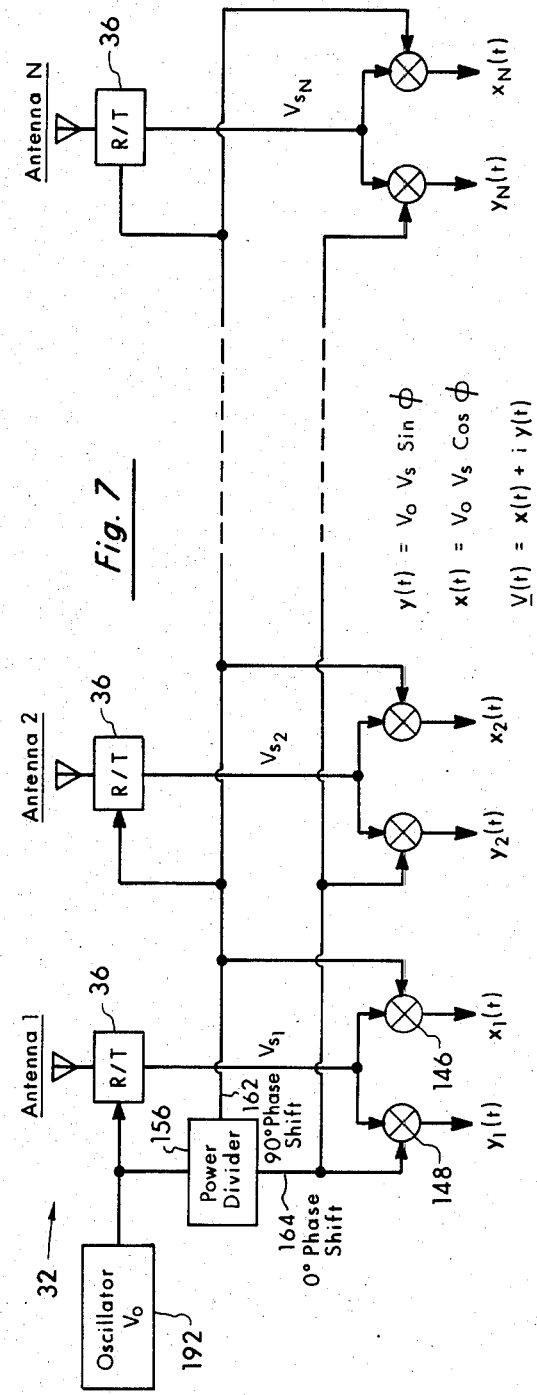
FIG. 7 is a schematic block diagram of the quadrature phase detector of the present invention.

FIG. 7 is a schematic block diagram illustrating the functions performed by the quadrature phase detector. Considering a single array of antennas 32, a plurality of individual antennas in array 32 produce a plurality of temporal pulses received from a plurality of moving targets. These temporal pulses are applied to receive/transmit switches 36 which function to switch the antenna array 32 between the receive and transmit mode. Oscillator 192 produces a time series of pulses V(t) which comprise the 2.66 MHz signal generated by the transmitter portion of the present invention. This signal is supplied to the receive/transmit switches 36 for transmitting the 2.66 MHz signal when the receive/transmit switches 36 are in the transmit mode. The transmitted signal V(t) is also applied to a power divider 156 which divides the signal into a 90 degree phase shifted signal 162 and a zero degree phase shifted signal 164. Each of these signals is supplied to mixers 146, 148, respectively which produce the in-phase x(t) and quadrature y(t) components of the complex voltage temporal function V(t). Consequently, the output of the quadrature phase detector 104, illustrated in FIG. 7, can be expressed as follows:

$$V(t) = x(t) + iy(t) \tag{1}$$

where:

$$x(t) = V_o V_s \cos \phi \tag{2}$$

$$y(t) = V_o V_s \sin \phi \tag{3}$$

$V_o$ = transmitted complex voltage function (times series of pulses $V_o(t)$).

$V_s$ = received or reflected function (times series of pulses returned from the target $V_s(t)$).

As is illustrated in FIG. 7, each sensor element, i.e., each antenna produces a complex voltage temporal function V(t) which appears as separate x(t) and y(t) components having digital values.

Of course, any desired phase detection technique can be used to characterize the complex voltage signal including signal multiplication techniques, zero crossing techniques analog, and digital filtering techniques, etc.

Figure 8:
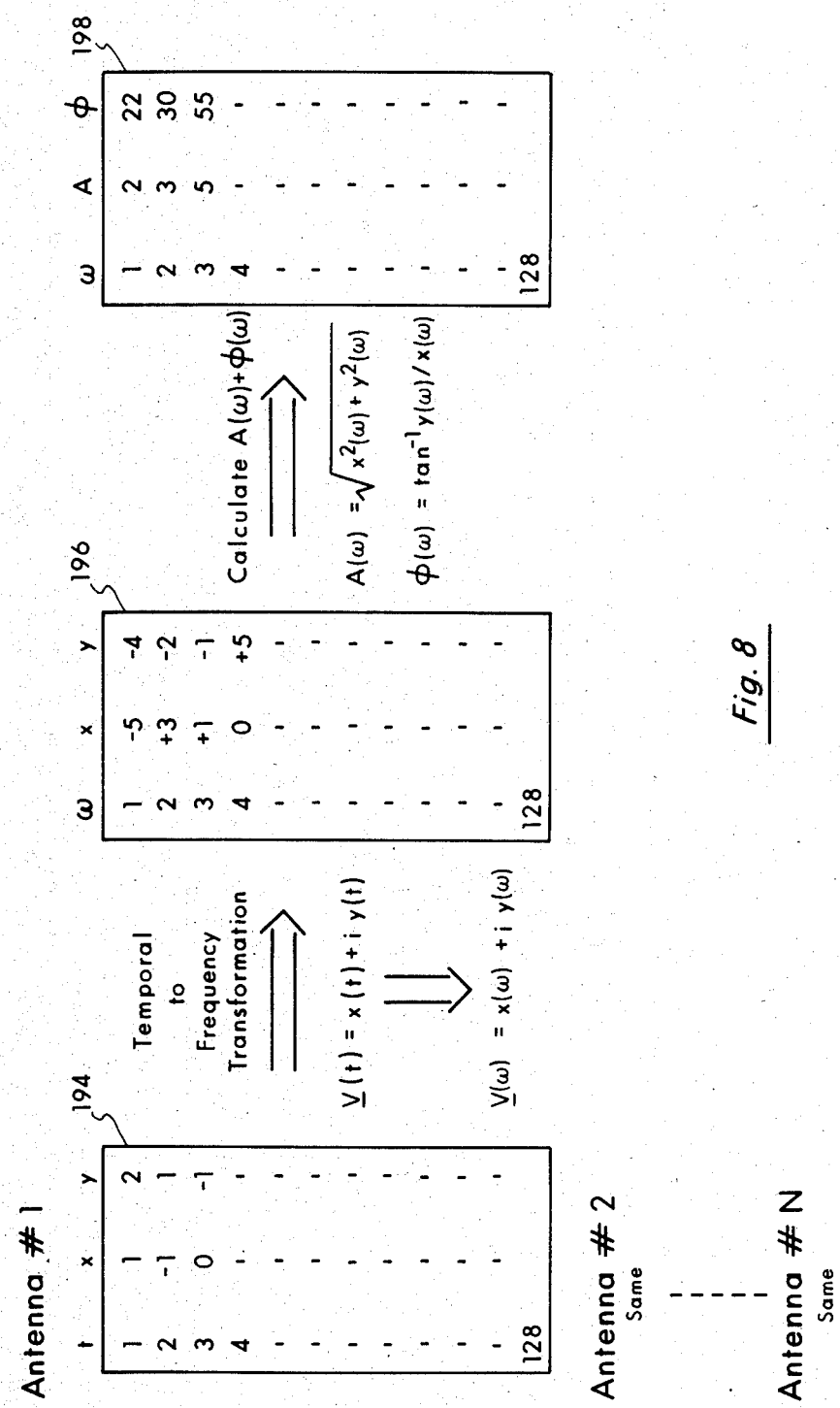
FIG. 8 is a schematic diagram of the transformation techniques utilized in accordance with the present invention.

FIG. 8 schematically illustrates the functions performed by the temporal to frequency transformation device 172. As shown in FIG. 8, the output of each quadrature phase detector connected to each receiver channel for each antenna produces both x(t) and y(t) digital components for each time period. FIG. 8 illustrates a time sampling of 128 time periods for which both x(t) and y(t) digital components are generated. These complex voltage temporal functions V(t) are transformed to doppler frequency functions V(w) by the use of a temporal to frequency transformation function, such as a fast Fourier transform, fast Hadamard transform, etc. This transformation is mathematically indicated as follows:

$$V(t) = x(t) + iy(t) \rightarrow V(w) = x(w) + iy(w) \tag{4}$$

where: w = doppler frequency indicative of relative movement between antennas (sensors) and targets.

The time domanin digital data chart 194 is then transformed into a frequency domain data chart 196, as illustrated in FIG. 8. For each doppler frequency (w) both a real component x(w) and imaginary component y(w) is produced. Both the time domain data chart 194 and the frequency domain data chart 196 are produced for antennas 2 through N as schematically illustrated in FIG. 8.

The data derived from the frequency data chart 196 is then used to calculate the amplitude values A(w) and phase values $\phi(w)$ for each doppler frequency. A amplitude value A(w) represents the amplitude of the return at a particular doppler frequency and is calculated as follows:

$$A(w) = \sqrt{x^2(w) + y^2(w)} \tag{5}$$

Similarly, the phase value comprises the phase value of the return signal for each doppler frequency and is calculated as follows:

$$\phi(w) = \tan^{-1} y(w)/x(w) \quad (6)$$

From this, an amplitude and phase value data chart 198 can be derived for each antenna return.

FIG. 9 illustrates a graphical depiction of the data produced on the amplitude and phase data chart 198. For each antenna, a separate plot is provided of doppler frequency versus amplitude and doppler frequency versus phase value. As illustrated in FIG. 9, the amplitude returns for both antenna 1 and antenna 2 indicate that possible targets may exist at both the doppler frequencies $W_a$ and $W_b$. The phase values at doppler frequencies $W_a$ and $W_b$ for both antenna 1 and antenna 2 are illustrated in a separate plot in FIG. 9. The difference in phase values between the returns for antenna 1 and antenna 2 can be utilized to determine the zenith angle $\theta$ to locate targets for specified doppler frequencies by determining the difference in phase values at those doppler frequencies using the interferometry techniques illustrated in FIG. 11. Additionally, the amplitude versus doppler frequency responses can be examined for each doppler frequency to determine if an amplitude response is received on each of the antennas which exceeds a predetermined response value to make and initial determination of the possible existence of a target at a predetermined doppler frequency. Also, responses below a predetermined value can be examined to eliminate large returns. Additionally, the returns can be sorted by amplitude in any desired manner for selective detection of targets having desired characteristics.

Figure 10:
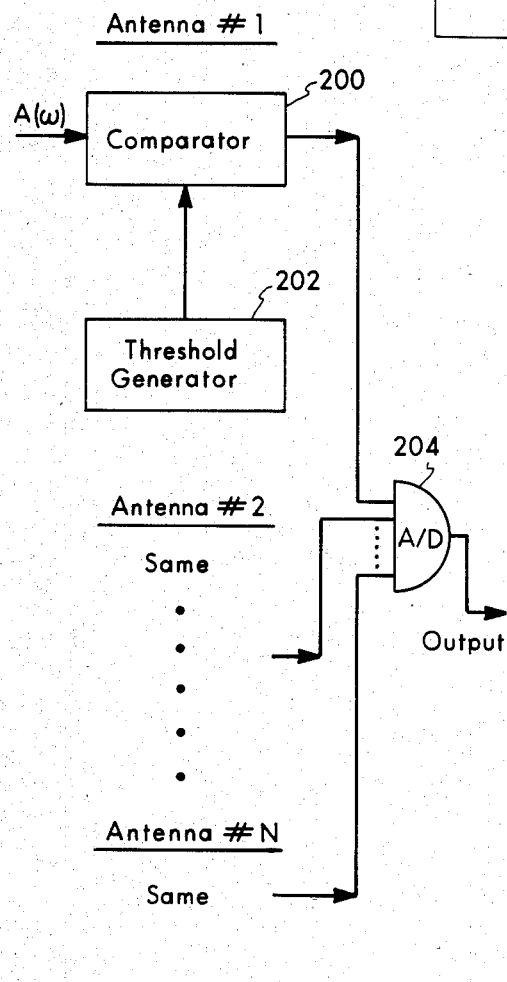
FIG. 10 is a schematic block diagram illustrating the manner in which the amplitude detector operates.

FIG. 10 schematically illustrates the operation of amplitude detector 176. The amplitude data from amplitude value and phase value chart 198 is directed to the amplitude detector 176 for each value of the doppler frequency (w). For example, the amplitude values for the first doppler frequency (w) from each antenna are applied to a series of comparators 200 which compare the amplitude value with a predetermined threshold value produced by threshold generator 202. If all of the amplitude values exceed the threshold value for each antenna response, an output is produced by logical AND circuit 204 indicating the presence of a possible target moving towards or away from the antenna array at the first doppler frequency. This procedure is duplicated for each doppler frequency. For the doppler frequency at which the amplitude detector 176 indicates the possible existence of a target, the phase values versus doppler frequency response, as illustrated in FIG. 9, are examined by interferometry device 178.

Figure 11:
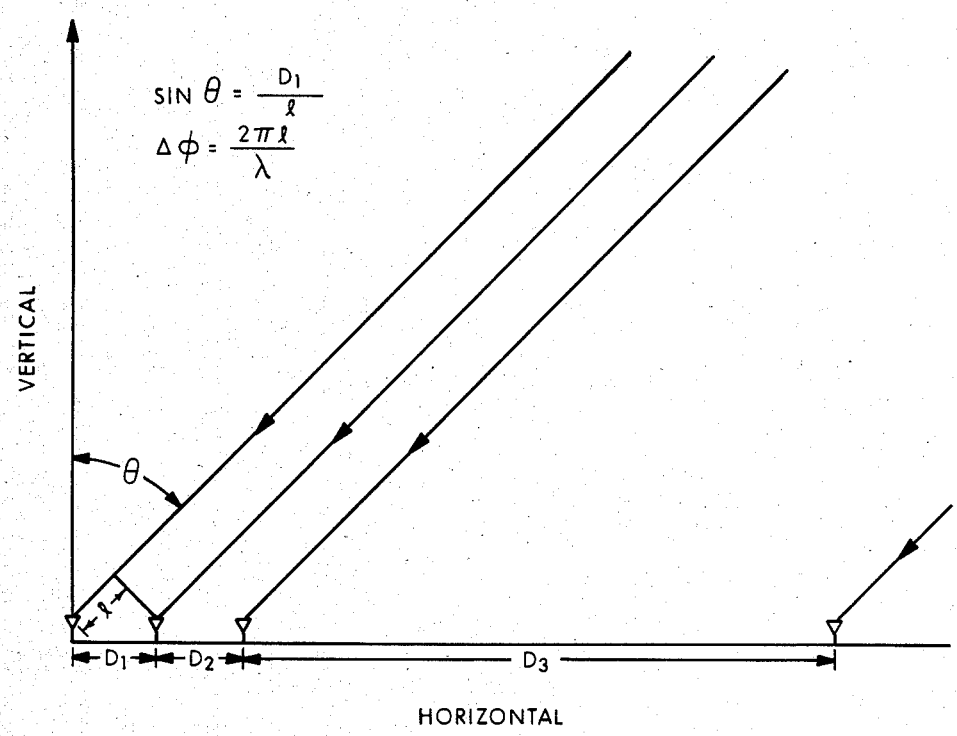
FIG. 11 is a schematic diagram illustrating the manner in which interferometry techniques are utilized in accordance with the present invention.

FIG. 11 schematically illustrates the manner in which the zenith angle $\theta$ is derived by the interferometry device 178. FIG. 11 assumes that the target comprises a point source located at infinity. Consequently, the zenith angle $\theta$ for the returns for each of the antennas is constant. It can be readily seen from FIG. 11 that:

$$\sin \theta = l/D \quad (7)$$

where:
l = difference in travel distance of the signal for two antennas
D = separation between the two antennas It is also known that the difference in phase between the signal received by the two antennas is a function of the distance l divided by the wavelength of the received signal. By eliminating multiple wavelengths ($2\pi$) the change in phase angle can be expressed as follows:

$$\Delta\phi = 2\pi l/\lambda \quad (8)$$

Consequently, the distance l can be determined in equation 7 by measuring the phase difference ($\Delta\phi$) of the signals received by the two antennas. The zenith angle $\theta$ is then calculated as follows:

$$\theta = \sin^{-1} (\lambda \cdot \Delta\phi/2\pi \cdot D) \quad (9)$$

Each of these parameters is known, i.e., the wavelength, the difference in phase angle between the two antennas and the distance of separation of the antennas so that the zenith angle $\theta$ can be readily measured. Of course, for each potential target indicated by an amplitude return, from amplitude detector 176, illustrated in FIG. 10, the difference in the phase values $\phi(w)$ can be readily determined for each doppler frequency. This difference in phase value comprises the $\Delta\phi$ value so that a zenith angle can be determined by comparing the difference in phase value $\Delta\phi$ of the responses of any pair of antennas. If the distance of separation D of the antennas is less than a half wavelength, the target can be unambiguously identified from $-180$ degrees to $+180$ degrees, as illustrated in FIG. 11.

Figure 12:
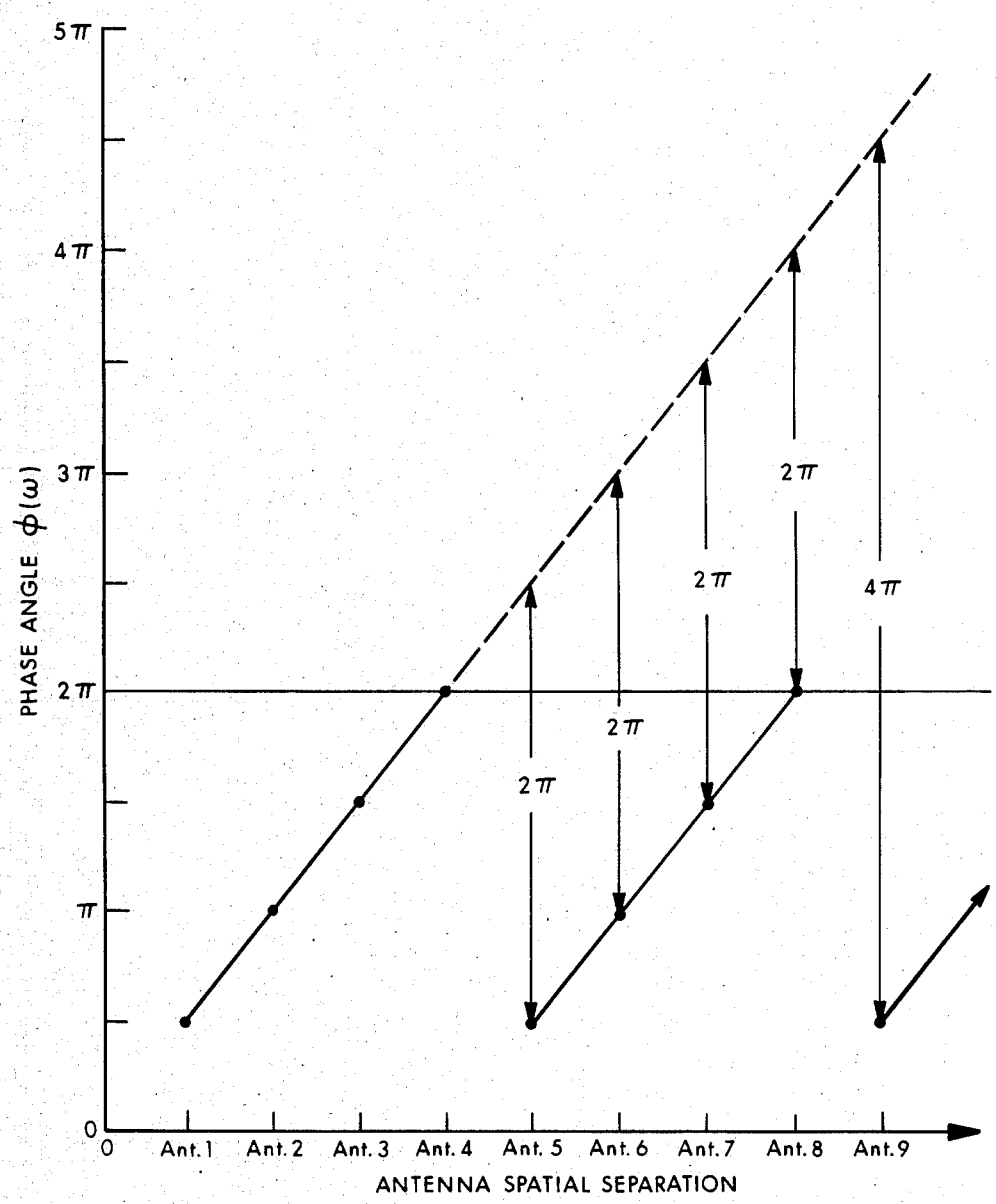
FIG. 12 is a schematic graphical depiction of phase values versus the antenna spatial separation for the various antennas of the present invention.

FIG. 12 graphically depicts the functions performed by phase fitting device 180. Phase fitting device 180 provides information to distinguish potential targets from actual targets by comparing the phase differences from multiple antennas within the array. The phase values for each of the antennas is plotted versus the antenna spatial separation. FIG. 12 depicts phase values for 9 antennas at a single doppler frequency. FIG. 12 illustrates a linear response of phase angle values versus antenna spatial separation. The phase values for antenna #5 through antenna #8 are greater than $2\pi$ radians so that $2\pi$ radians must be added to these values to determine if a linear relationship exists. Similarly, antenna #9 requires that the value of $4\pi$ be added to the phase values to determine if a linear relationship exists.

FIG. 13 comprises a table which lists the possible displacement patterns for five antennas. These displacement patterns further allow for a plus or minus 90 degree displacement due to noise on the individual antennas. As shown in FIG. 13, there are 49 displacement patterns possible. FIG. 12 illustrates that the phase versus antenna spacing can be fit to a linear response only after performing a correction consisting of adding or subtracting $2\pi$ radians (360 degrees) to the phase values of some antennas. FIG. 13 illustrates that the center antenna, i.e. antenna #3, is the reference from which the other antennas are corrected. Since there is no way of knowing beforehand which of the 49 possible displacement patterns is correct, the 49 possible displacement patterns must be compared to the returns of the five antennas and a calculation made of the error of the fit in each case. The fit with the smallest error, if that error is less than some threshold value, e.g. 15 degrees, determines the existence of a scattering point. Using equation 9, the zenith angle can be calculated.

The fitting process can be described mathematically as follows. If the measured phase value is V(j), where j = antenna number for equally spaced antennas, then a corrected phase is given by:

$$\phi_j' = \phi_j + 360 M_{ij} \quad (10)$$

where:
  $M_{ij}$ = is the displacement pattern number given in FIG. 13
  i = pattern number (0–49)
  j = antenna number (0–5)
  $\phi_j$ = measured phase value for the antenna being fit into the displacement pattern.

The fitting procedure requires that a straight line be fit to the corrected data in the form:

$$A + jB \tag{11}$$

The problem is to determine the outcome of the value of A and B for the fitting procedure. This is accomplished by a conventional least squares approach in which it is desirable to minimize the rms error ($\epsilon$). The rms error ($\epsilon$) is given by:

$$\epsilon = \sqrt{\frac{1}{5} \sum_{j=1}^{5} [\phi_j + 360 M_{ij} - A - jB]^2} \tag{12}$$

To do this, the partial derivatives, $\partial\epsilon/\partial A$ and $\partial\epsilon/\partial B$, must be determined. These partial derivatives are then equated to zero in order to find the minimum values. This gives:

$$5A + 15B = \sum_{j=1}^{5} \phi_j + \sum_{j=1}^{5} M_{ij} \tag{13}$$

$$15A + 55B = \sum_{j=1}^{5} j\phi_j + \sum_{j=1}^{5} jM_{ij} \tag{14}$$

Solving these equations for A and B gives:

$$A = 1.1 \left( \sum_{j=1}^{5} \phi_j + M_{ij} \right) - .3 \left( \sum_{j=1}^{5} j\phi_j + \sum_{j=1}^{5} jM_{ij} \right) \tag{15}$$

$$B = -.3 \left( \sum_{j=1}^{5} \phi_j + \sum_{j=1}^{5} M_{ij} \right) + .1 \left( \sum_{j=1}^{5} j\phi_j + \sum_{j=1}^{5} jM_{ij} \right) \tag{16}$$

Once A and B are known, then equation 12 can be used to calculate the rms error ($\epsilon$). By doing this forty-nine times, i.e., once for each pattern number of table 10, the choice that gives the smallest RMS error is selected. If this error is less than a predetermined threshold value, e.g., 15 to 25 degrees, then it is concluded that a real target has been located. The zenith angle is then calculated as follows:

$$\theta = \sin^{-1} (B \cdot \Delta\phi/360D) \tag{17}$$

To extend this process to a second dimension, each linear array 32 and 34 is treated separately and a scattering point is only treated as a target if the two independently calculated least squares straight line fits and rms error calculations independently indicate a valid target at exactly the same doppler frequency. In this manner, the present invention confirms the spatial existence of a target in a single spatial location from the simultaneous detection of the temporal series of pulses reflected from the targets by the independent sensors to thereby distinguish the target from noise. In other words, by comparing the difference in phase values of the phase functions $\phi(w)$ produced by different antennas as a function of spatial separation D of the antennas, a multiple number of targets can be distinguished from noise by identifying a common locational source of the temporal series of pulses reflected from the targets for each doppler frequency.

Consequently, each of the sensors has a phase value at a specific doppler frequency which, when combined with the other phase values, are collectively compatible to indicate a single target as a source for a predetermined doppler frequency.

Range detector 182 utilizes clock pulses 184 to detect the delay period between the transmission of the pulse and its receipt at antenna array 32, 34. By knowing the time delay period, the time of flight of the temporal series of pulses is calculated so that targets at a predetermined range can be investigated by examining return pulses having predetermined time delay. Range gating is a common method of determining the distance of targets and is more fully disclosed in "The Radar Handbook" by Merrill I. Skolnik, McGraw Hill Co., 1970, N.Y., N.Y. which is specifically incorporated herein by reference for all that it discloses. A two frequency technique of providing higher resolution range information is more fully disclosed in FIGS. 15 and 16 herein.

The two antenna array system provides two zenith angles, i.e., one for the north-south plane and another for the east-west plane. A third coordinate is supplied by the range of the scattering point which is determined from the range gate data provided by range detector 182. The two zenith angles and the range data comprise a three-dimensional description of the location of the scattering point. This is then converted to a conventional x, y, z cartesian coordinate system where x is the displacement in the east-west direction, y is the displacement in the north-south direction and z is the displacement in the vertical direction. The cartesian coordinates are calculated as follows:

$$x = R \sin \theta_{EW} \tag{22}$$

$$y = R \sin \theta_{NS} \tag{23}$$

$$z = \sqrt{R^2 - x^2 - y^2} \tag{24}$$

where:
  R = detected range
  $\theta_{EW}$ = zenith angle in the east-west plane
  $\theta_{NS}$ = zenith angle in the north-south plane Cartesian coordinate converter 186 functions to take the range and zenith data and transform it into a cartesian coordinate system. The cartesian coordinate system allows scattering point parameters to be sorted by altitude rather than radial distance.

The motion characterization device 188 characterizes the motion field of the target array. In accordance with the invention, this is accomplished by a least squares fit of the identified target point in each region of interest with a vector motion field in the form of:

$$VMF = [U + a(1,1)^*x + a(1,2)^*y + a(1,3)^*z]\vec{x} + \tag{18}$$

$$[V + a(2,1)^*x + a(2,2)^*y + a(2,3)^*z]\vec{y} +$$

$$[W + a(3,1)^*x + a(3,2)^*y + a(3,3)^*z]\vec{z}$$

where:

VMF = vector motion field
U = mean motion in the x direction
V = mean motion in the y direction
W = mean motion in the z direction
x = East-West spatial coordinate
y = North-South spatial coordinate
z = Vertical coordinate
$\vec{x}$ = unit vector in the x direction
$\vec{y}$ = unit vector in the y direction
$\vec{z}$ = unit vector in the z direction
and a(i,j) are the various spatial partial derivatives of the vector motion field, so that the mean, divergence, and vorticity of the motion field are given by:

$$\text{Mean motion} = U*\vec{x} + V*\vec{y} + W*\vec{z} \qquad (19)$$

$$\text{Divergence} = a(1,1) + a(2,2) + a(3,3) \qquad (20)$$

$$\text{Vorticity} = [a(3,2) - a(2,3)]*\vec{x} + \qquad (21)$$
$$[a(1,3) - a(3,1)]*\vec{y} +$$
$$[a(2,1) - a(1,2)]*\vec{z}$$

Display 190 comprises any one of the number of standard display devices such as CRT's, LCD's, etc. Since the present invention provides three-dimensional data, three dimensional display devices can also be utilized in accordance with the present invention. The data produced by the present invention can be processed in display device 190 using conventionally available computer graphic techniques for forming images on various electronic display devices.

As set forth above, each of the functions performed by the processor 28 can be performed by either a hardware or software implementation. The above description has set forth a description of the invention which has primarily been implemented in hardware. The following pseudo-code presents a method for implementing the present invention in software. The starting point is the receipt of a time series of pulsed-radar returns.

| Pseudo Code |
|---|
| 1. Read In and Fourier-Transform the Data |
|    For 50 Ranges |
|    For 2 Linear Arrays (N-S and E-W) |
|    For 5 Antennas |
|    Read In 128 Complex Voltages (as X-Y pairs) |
|    For 128 Fourier Frequencies |
|    Calculate the Complex Fourier Transforms |
|    (as X-Y pairs) |
|    Next Fourier Frequency |
|    Next Antenna |
|    Next Linear Array |
|    Next Range |
| 2. Calculate Fourier Amplitude and Phase From The Complex Transform |
|    For 50 Ranges |
|    For 128 Fourier Frequencies |
|    For 2 Linear Arrays |
|    For 5 Antennas |
|    Read In the X-Y Pair From the Transform |
|    Calculate Phase = Arctan (Y/X) |
|    Amplitude = SQRT (X2 + Y2) |
|    Next Antenna |
|    Next Linear Array |
|    Next Fourier Frequency |
|    Next Range |
| 3. Fit Fourier Phase Vs Antenna Number With A Straight Line |
|    For 50 Ranges |

| Pseudo Code -continued |
|---|
|    For 128 Fourier Frequencies |
|    For 2 Linear Arrays |
|    Fit Phase Vs Antenna Number With a Straight Line. |
|    Calculate Phase at Center Antenna, Rate of Change of Phase Across Antenna Array (DPDA), and the RMS Error Of the FIT (Error). |
|    Next Linear Array |
|    Next Fourier Frequency |
|    Next Range |
| 4. Determine Which Spectral Features Are From Valid Scattering Points |
|    For 50 Ranges |
|    For 128 Fourier Frequencies |
|    Are Both DPDA (E-W) and DPDA (N-S) Less Than 25 Degrees? |
|    If Yes: This Spectral Component is From a Valid Scattering Point |
|    If No: Disregard This Spectral Component |
|    Next Fourier Frequency |
|    Next Range |
| 5. Calculate the Locations of the Valid Points |
|    For Each Valid Point |
|    X-Coordinate = Range*Lamda*DPDA (E-W)/(2*PI*D) |
|    (X is East) |
|    Y-Coordinate = Range*Lamda*DPDA (N-S)/(2*PI*D) |
|    (Y is North) |
|    Z-Coordinate = SQRT (1-X2-Y2) |
|    (Z is Up) |
|    (PI = 3.1415; D = Antenna Spacing = 0.707*Lamda; Lamda = Radar wavelength) |
|    Next Valid Point |
| 6. Calculate the Radial Velocity of Each Valid Point |
|    For Each Valid Point |
|    Radial Velocity = 0.5*Speed of Light*Fourier Frequency/Radar Frequency |
|    Next Valid Point |
| 7. Gather the "Scattering-Point Parameters" at Each Altitude |
|    Scattering-Point Parameters: |
|    Radial Velocity of the Scattering Point |
|    X, Y, and Z Coordinates of the Scattering Point |
|    Average Amplitude of the Scattering Point On the N-S Array |
|    Average Amplitude of the Scattering Point On the E-W Array |
|    Average Phase (Referenced to Center Antenna) On the N-S Array |
|    Average Phase (Referenced to Center Antenna) On the E-W Array |
|    Error of the Phase Fit on the N-S Array |
|    Error of the Phase Fit on the E-W Array |
| 8. Fit a Wind Vector to the Scattering-Point Parameters at Each Altitude |
|    For 50 Altitudes |
|    Calculate U, V, W for Minimum RMS error. |
|    RMS Error is Given By: |
|    For Each Valid Point |
|    RMS Error = RMS Error + SQRT [(U*X + V*Y + W*Z)/Range] |
|    Next Valid Point |
| 9. End. |

Figure 14:
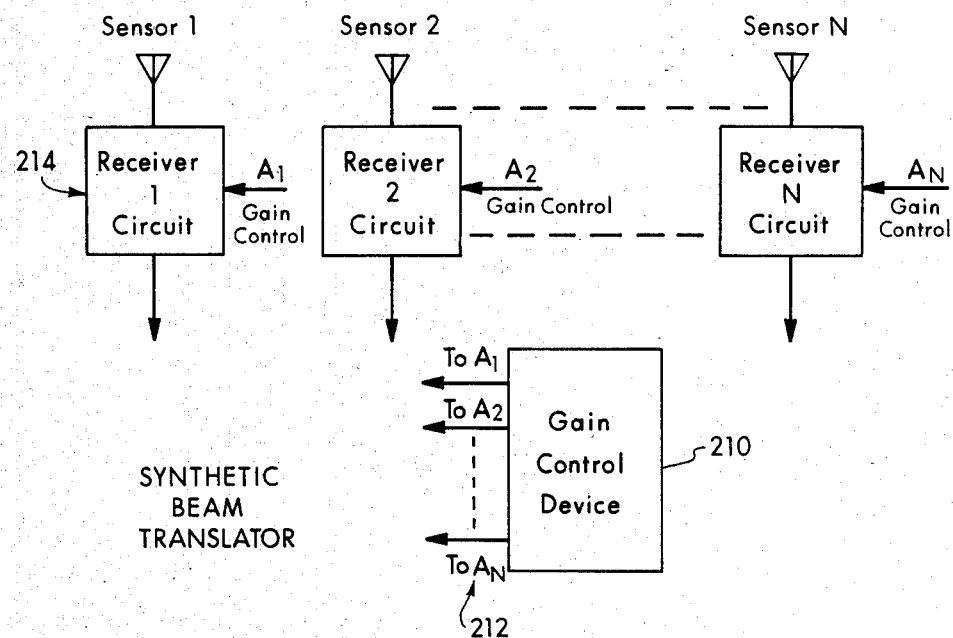
FIG. 14 is a schematic block diagram of the synthetic beam translator of the present invention.

FIG. 14 disclosed a synthetic beam translator for use with the present invention to achieve the effects of relative motion between the targets and the sensors when no relative motion exists. Relative motion is required to perform the temporal to frequency domain transformation. The temporal to frequency domain transformation is based upon the doppler frequency produced by the relative motion produced between the sensors and the targets. Synthetic motion can be induced into the data by the manner in which it is sampled by the antenna array. For example, a synthetic moving transducer voltage series can be constructed by taking the first pulse from the first sensor, the second pulse from the second sensor, etc., the 128th pulse from the 128th sensor. This produces the same voltage series that would have been measured by a transducer moving across a fixed array. A much finer scale of motion can be synthesized from a pair of stationary real sensors by combining the signals from the two real sensors in a time varying combination. For example, if $V_1(t)$ is the complex voltage series of the first transducer and $V_2(t)$ is the complex voltage series from the second transducer, the first voltage can be progressively reduced, while the second voltage is progressively increased, in a manner similar to turning down the first voltage while simultaneously turning up the second voltage, to obtain:

$$V_s(t) = V_1(t)*(1-at) + V_2(t)*(at) \qquad (25)$$

where: at = an attenuation value which varies between 0 and 1.

The effect of the transducer represented by this combination of voltages is a transducer progressively moving from the position of transducer #1 to the position of transducer #2. Consequently, the voltage outputs of the various receivers illustrated in FIG. 2 can be progressively varied to induce motion across an entire antenna array. A total number of N stationary real sensors can therefore generate N−1 simultaneously synthetically moving transducers. By using parallel rows of real transducers, a number of parallel synthetically moving transducers can be constructed so that a doppler frequency is induced between a stationary target and stationary transducers.

FIG. 14 schematically illustrates a method for achieving synthetic beam translation in the device illustrated in FIGS. 2, 3 and 4. As shown in FIG. 14, a gain control device 210 is employed which produces a series of gain control output signals $A_1, A_2, \ldots A_N$ 212 which are applied to receiver circuit 214. Gain control device 210 produces gain control signals which vary the gain of the receiver circuits 214 in a linear manner from one receiver circuit to another to induce a synthetic linear motion in the sensor array.

Figure 16:
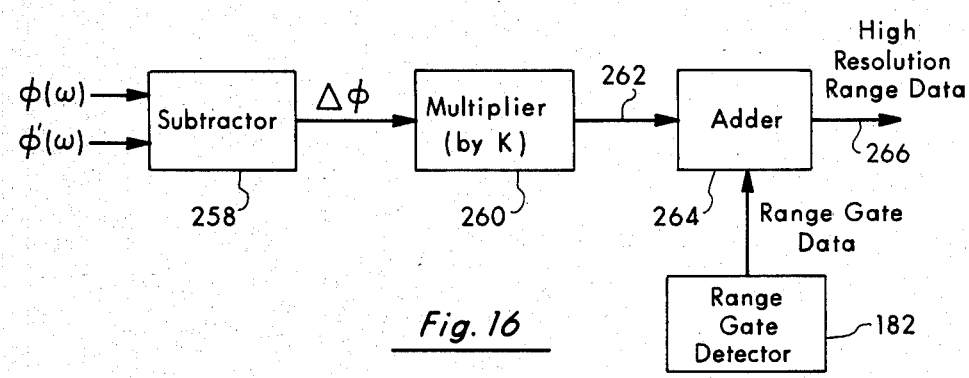
FIGS. 15 and 16 schematically illustrate a two-frequency range detector which can be utilized with the present invention to provide high resolution range information.
Figure 15:
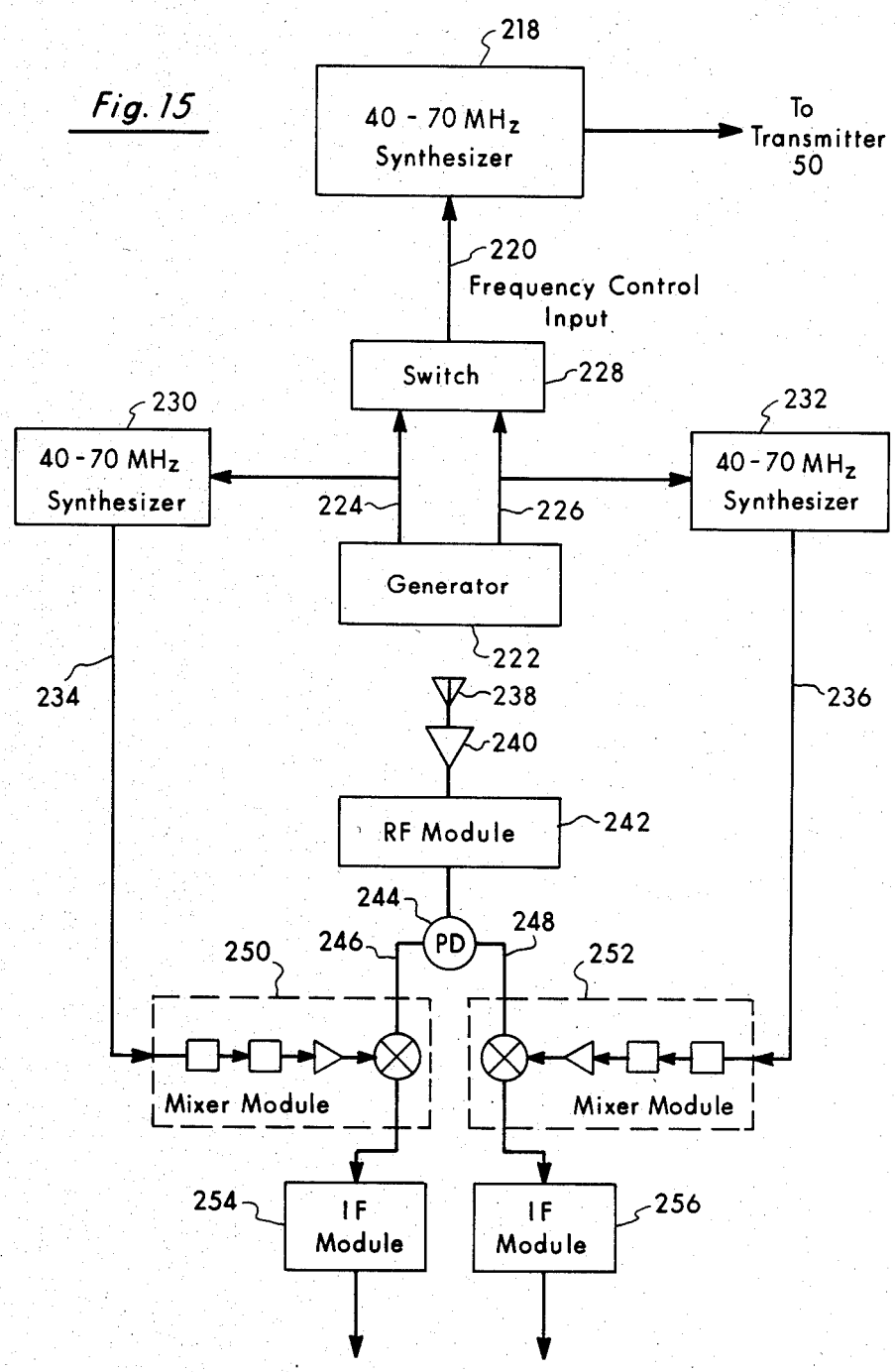

FIGS. 15 and 16 schematically illustrate a two-frequency range detector which can be utilized with the present invention to provide high resolution range information to complement the range information provided by the range gate detector 182. FIG. 15 discloses the manner in which the two-frequency range detector can be implemented in a device such as illustrated in FIGS. 2, 3, and 4. The 40 to 70 MHz synthesizer 54 of FIG. 2 is used to generate a mixer frequency for both the transmitter circuit 50 and the receiver circuit 38. Referring to FIG. 15, 40–70 MHz synthesizer 218 would be used to replace synthesizer 54 of FIG. 2 to provide a mixer frequency for transmitter 50. Synthesizer 218 has an input 220 which comprises a frequency control device capable of producing a phase coherent shift from a first frequency to a second frequency within one pulse of the transmitter circuit. For example, synthesizer 218 could produce a mixer frequency of 43.285 MHz during the first portion of the transmission pulse and then phase coherently shift to a frequency of 43.335 MHz within a single pulse transmission. This would produce a transmitted frequency of 2.66 MHz during a first portion of the transmitted pulse and a second frequency of 2.71 MHz during a second portion of the pulse. This gives a difference of 50 kilohertz in the two transmitted frequencies. Generator 222 produces two control signals 224, 226 which are switched by switching device 228 to provide a single frequency control input 220 to the synthesizer 218. The two control signals 224, 226 comprise the control signals for operating synthesizer 218 at the two different frequencies. Switch 228 is designed to interact with synthesizer 218 to provide a phase coherent shift from the first to the second frequency.

Control signals 224, 226 are also applied to synthesizers 230, 232, respectively, to provide two mixer frequencies 234, 236 for use in the receiver circuits of the two frequency range detector embodiment of the present invention. In a manner similar to that illustrated in FIGS. 2, 3, and 4, a series of antennas 238 are connected to a series of preamps 240 and a series of RF modules 242 contained within the receiver circuit. Because two different frequencies are used, the two frequency range detector embodiment must detect both frequencies simultaneously. A power divider 244 divides the output from the RF module 242 into two signals 246, 248. Each of these signals is applied to a separate mixer module 250, 252 respectively. The two different frequencies 234, 236 are applied to mixer modules 250, 252, respectively, to produce two output frequencies which are applied to the two IF modules 254, 256. All of the remaining circuitry illustrated in FIGS. 2, 3, and 4 is then duplicated, up to the phase and amplitude generator 174, for each frequency obtained from each separate antenna of the series of antennas 238.

The phase values obtained from each antenna are then applied to the device illustrated in FIG. 16. The phase value $\phi(w)$ for the first frequency and the phase value for the second frequency $\phi'(w)$ are both applied to a subtractor device 258 which produces a difference signal $\Delta\phi$ which is the difference in the phase values for the two frequencies. This difference in phase values is directly proportional to the location of the target detected within the range gate. The phase difference signal $\Delta\phi$ is applied to a multiplier 260 which functions to multiply the phase value signal by a constant K to achieve the proper proportionality. This output signal is applied to an adder 264 by way of connector 262. Adder 264 adds the phase difference signal which has been multiplied by constant K to provide the proper proportionality to the range gate data provided by range gate detector 182. The range gate data comprises range gate information to which the phase difference is added in adder 264 to provide a high resolution range data signal 266.

The present invention is therefore capable of locating and identifying a multiple number of targets simultaneously with a high degree of resolution. The information obtained can be used to form images of the targets and can be implemented in a wide variety of technical areas, such as imaging radar as disclosed herein, medical body scanners, materials testing for internal defects, examination of three dimensional dynamics of flames and combustion prothesis, imaging sonar, inspection of dams and bridges, high resolution mapping of lake and ocean bottoms, underwater archeology and geology, fish counting and tracking, three dimensional fluid flow in wind tunnels and pipes, non-intrusive tree ring counting and growth studies, production line quality control for manufacturing processes, digital imaging for robotics and the non-intrusive examination of orbiting satellites. High resolution can be achieved using two frequency range detector devices. Additionally, synthetic beam translation techniques can be utilized to image non-moving targets.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except in so far as limited by the prior art.

What is claimed is:

1. The process for providing locational information of a plurality of targets comprising the steps of:
   detecting temporal pulses received from said plurality of targets substantially simultaneously by at least three independent sensors;
   producing complex voltage temporal functions V(t) separately for each of said independent sensors;
   separately transforming said complex voltage temporal functions V(t) to doppler frequency functions V(w) which vary with a separate doppler frequency (w) of each target, said separate doppler frequency of each target generated as a result of an independent velocity of each target of said plurality of targets relative to said independent sensors and independent of velocity of other targets of said plurality of targets;
   generating phase values $\phi(w)$ from said doppler frequency functions V(w) indicating a plurality of scattering points;
   performing scattering point analysis to identify and distinguish said plurality of targets from noise and simultaneously locate said plurality of targets by separating each target according to said separate doppler frequency for each target and by determining a common locational source of said temporal pulses returned from each target comprising the steps of:
      generating phase difference functions $\Delta\phi(w)$ from the difference between said phase values $\phi(w)$ for a plurality of pairs of said independent sensors;
      comparing said phase difference functions $\Delta\phi(w)$ at corresponding doppler frequencies;
      analyzing said phase difference functions $\Delta\phi(w)$ as a function of spatial separation of said plurality of pairs of said independent sensors; and,
      identifying each target at said corresponding doppler frequencies by interferometrically determining a common locational source of said temporal pulses from analysis of said phase difference functions $\Delta\phi(w)$ as a function of spatial separation of said plurality of pairs of said independent sensors.

2. The process of claim 1 wherein said step of detecting further comprises:
   sequentially scanning said independent sensors to produce synthetic beam translation of said independent sensors to induce said independent velocity of each target relative to said sensors.

3. The process of claim 1 further comprising the step of:
   transmitting said temporal pulses to illuminate said targets.

4. The process of claim 3 wherein said step of transmitting comprises:
   sequentially transmitting said temporal pulses across a transmitter array to induce said relative motion between said targets and said sensors.

5. The process of claim 1 wherein said step of detecting comprises:
   detecting said temporal pulses produced by a self-luminous target.

6. The process of claim 1 further comprising the step of:
   examining said doppler frequency (w) to determine radial velocity of said moving targets.

7. The process of claim 1 further comprising the step of:
   sorting said doppler frequency functions by amplitude to selectively examine targets having predetermined characteristics.

8. The process of claim 3 further comprising the step of:
   measuring the time of flight of said temporal pulses to provide range information of the radial distance (R) of said targets from said sensors.

9. A process for detecting a plurality of targets and providing three-dimensional locational information of said plurality of targets comprising the steps of:
   transmitting a temporal series of pulses to illuminate said plurality of targets;
   substantially simultaneously detecting said temporal series of pulses reflected from said targets by at least three independent sensors;
   measuring the time of flight of said temporal series of pulses reflected from said targets to provide range information of the radial distance (R) of said targets from said sensors;
   producing complex voltage temporal functions V(t) from said temporal series of pulses reflected from said moving targets separately for each of said independent sensors, said complex voltage temporal functions having an in-phase component x(t) and a quadrature component y(t);
   separately transforming each of said complex voltage temporal functions V(t) to doppler frequency functions V(w) which vary with a separate doppler frequency (w) of each target of said plurality of targets, said separate doppler frequency of each target generated as a result of an independent velocity of each target relative to said independent sensors which is unrelated to and independent of velocities of other targets of said plurality of targets;
   generating phase values $\phi(w)$ and amplitude values A(w) from said doppler frequency functions V(w) indicating a plurality of scattering points;
   performing scattering points analysis to identify and distinguish said plurality of targets from noise and simultaneously locate said plurality of targets by separating each target according to said separate doppler frequency for each target and by determining a common locational source of said temporal pulses for each target comprising the steps of:
      generating phase difference functions $\Delta\phi(w)$ from the difference between said phase values $\phi(w)$ for a plurality of pairs of said independent sensors;
      comparing said phase difference functions $\Delta\phi(w)$ at corresponding doppler frequencies;

analyzing said phase difference functions $\Delta\phi(w)$ as a function of spatial separation of said plurality of pairs of said independent sensors; and, identifying each target at said corresponding doppler frequencies by interferometrically determining a common locational source of said temporal pulses from analysis of said phase difference functions $\Delta\phi(w)$ as a function of spatial separation of said plurality of pairs of said independent sensors.

10. The process of claim 9 further comprising the step of:

examining said doppler frequency (w) of said moving targets to determine radial velocity of said targets relative to said sensors.

11. The process of claim 9 wherein said step of transforming said complex voltage temporal functions $V(t)$ to doppler frequency functions $V(w)$ comprises the steps of:

transforming said in-phase component $x(t)$ of said complex voltage temporal function $V(t)$ to a real component $x(w)$ of said doppler frequency function $V(w)$;

transforming said quadrature component $y(t)$ of said complex voltage signal $V(w)$ of an imaginary component $y(w)$ of said doppler frequency function $V(w)$.

12. The process of claim 11 wherein said step of generating phase values $\phi(w)$ from said doppler frequency functions $V(w)$ comprises the step of calculating $\phi(w)$ from:

$$\phi(w) = \tan^{-1} y(w)/x(w).$$

13. The process of claim 11 wherein said step of generating amplitude values $A(w)$ from said doppler frequency functions $V(w)$ comprises the step of calculating $A(w)$ from:

$$A(w) = \sqrt{[x(w)]^2 + [y(w)]^2}.$$

14. The process of claim 9 wherein said step of transforming said complex voltage temporal functions $V(t)$ to doppler frequency signals $V(w)$ comprises the step of calculating $V(w)$ from:

$$\underline{V}(w) = \int_0^t [x(t) + i\, y(t)] e^{iwt} dt.$$

15. The process of claim 9 wherein said step of analyzing said phase difference functions $\Delta\phi(w)$ comprises the steps of:

analyzing said phase difference functions $\Delta\phi(w)$ to determine if said phase values vary substantially linearly with spatial separation (D) of said independent sensors;

calculating a zenith angle $\theta$ to determine the angular location of said targets as follows:

$$\theta = \sin^{-1}\left(\frac{\lambda \Delta\phi}{2\pi D}\right)$$

where
$\lambda$ = wavelength of said temporal series of pulses;

$\Delta\phi$ = the difference in phase values $\phi(w)$ of said temporal series of pulse simultaneously detected by said independent sensors;

D = the spatial separation of said independent sensors.

16. The process of claim 15 wherein said step of analyzing said phase difference functions $\Delta\phi(w)$ comprises the steps of:

eliminating $2\pi$ discontinuities from said phase values $\phi(w)$ by comparing said phase values $\phi(w)$ with all possible displacement patterns of said targets capable of producing a linear response;

fitting a least-squares linear response to said phase values $\phi(w)$;

comparing said root means square error of said least-squares linear response with a predetermined error limit to distinguish said moving targets from noise.

17. The process of claim 15 wherein said step of calculating a zenith angle $\theta$ comprises the steps of:

examining said phase values $\phi(w)$ of said independent sensors which are aligned in a first direction to obtain a first zenith angle $\theta_1$ of said targets to locate said targets in a first plane;

examining said phase values $\phi(w)$ of said independent sensors which are aligned in a second direction to obtain a zenith angle $\theta_2$ of said targets in said second direction.

18. The process of claim 17 further comprising the step of:

converting said radial distance (R), said zenith angle $\theta_1$ and said zenith angle $\theta_2$ to a cartesian coordinate system.

19. The process of claim 18 further comprising the step of:

characterizing the motion field of said moving targets from a vector motion field by mean motion, divergence and vorticity.

20. The process of claim 9 further comprising the step of:

sequentially scanning said independent sensors to produce synthetic beam translation of said independent sensors to induce said doppler frequency (w) in said complex voltage temporal functions $V(t)$ for targets which are stationary relative to said independent sensors.

21. The process of claim 20 wherein said step of sequentially scanning further comprises the step of:

combining the outputs of adjacent independent sensors in a progressively varying manner to induce a progressive doppler motion across said independent sensors.

22. The process of claim 9 further comprising the steps of:

fitting the radial velocities of said moving targets to a two-dimensional velocity of the form:

$$V = u^* X + v^* y$$

where:
V is a two-dimensional velocity vector describing the mean flow of said moving targets;
u is a scalar component of movement in the x direction;
x is a unit vector;
v is a scalar component of movement in the y direction; and
y is a unit vector normal to x;

for determining a two dimensional mean flow profile of said moving targets.

23. The process of claim 9 further comprising the steps of:
fitting the radial velocities of said moving targets to a two-dimensional velocity of the form:

$$\vec{s} = (u + A^*X)\vec{x} + (v + B^*Y)\vec{y}$$

where:
$\vec{s}$ is a two dimensional velocity vector describing the radial velocities and two-dimensional locations of said moving targets;
u is a scalar component of mean motion of said targets in the $\vec{x}$ direction;
A is the scalar component indicating the change in movement of said targets in the $\vec{x}$ direction;
X is the coordinate location of said moving targets in the $\vec{x}$ direction;
$\vec{x}$ is a unit vector;
v is a scalar component of mean motion of said targets in the $\vec{y}$ direction;
B is a scalar component indicating the change in movement of said targets in the $\vec{y}$ direction;
Y is the coordinate location of said moving targets in the $\vec{y}$ direction; and,
$\vec{y}$ is a unit vector normal to $\vec{x}$.

24. The process of claim 23 further comprising the steps of:
determining the two-dimensional divergence of the flow of said moving targets from:

$$\text{divergence} = A + B.$$

25. The process of claim 23 further comprising the steps of:
determining the two-dimensional curl (vorticity) of the flow of said moving targets from:

$$\text{vorticity} = (B - A)\vec{z}.$$

26. A process of providing three dimensional high resolution locational information of a plurality of independently moving targets comprising the steps of:
transmitting a time series of pulses having at least two frequencies to illuminate said moving targets;
detecting said time series of pulses returned from said moving targets substantially simultaneously by at least three independent sensors;
measuring the time of flight of said time series of pulses returned from said moving targets to provide a range window indicative of a range of radial distances of said targets from said sensors;
producing complex voltage temporal functions V(t) from said first and second time series of pulses reflected from said moving targets separately for each of said independent sensors, said complex voltage temporal functions having an in-phase component x(t) and a quadrature component y(t);
transforming said complex voltage temporal functions V(t) to doppler frequency functions V(w) which vary with a doppler frequency (w) of each target of said plurality of targets, said separate doppler frequency of each target generated as a result of an independent velocity of each target relative to said independent sensors which is unrelated to and independent of velocities of other targets of said plurality of targets;
generating phase values $\phi(w)$ and amplitude values A(w) from said doppler frequency functions V(w);
performing scattering point analysis to identify and distinguish said plurality of targets from noise and simultaneously locate said plurality of targets by separating each target according to said separate doppler frequency for each target and by determining a common locational source of said temporal pulses for each target comprising the steps of:
generating phase difference functions $\Delta\phi(w)$ from the difference between said phase values $\phi(w)$ for a plurality of pairs of said independent sensors;
comparing said phase difference functions $\Delta\phi(w)$ at corresponding doppler frequencies;
analyzing said phase difference functions $\Delta\phi(w)$ as a function of spatial separation of said plurality of pairs of said indpendent sensors; and,
identifying each target at said corresponding doppler frequencies by interferometrically determining a common locational source of said temporal pulses from analysis of said phase difference functions $\Delta\phi(w)$ as a function of spatial separation of said plurality of pairs of said independent sensors;
comparing said phase values $\phi(w)$ of said time series of pulses;
determining said radial distance of said targets within said range window from the difference in said phase values $\phi(w)$ of said time series of pulses.

27. The process of claim 26 wherein said step of transmitting said time series of pulses comprises:
transmitting a plurality of separate time series of pulses having different frequencies.

28. A system for simultaneously locating a plurality of indpendently moving targets and distinguishing said targets from noise comprising:
transmitter means for transmitting a temporal series of pulses to illuminate said targets;
sensor means for detecting said temporal series of pulses reflected from said targets;
phase detector means for producing at least three individual complex voltage temporal functions V(t) from said temporal series of pulses representative of the detection of said temporal series of pulses by said sensor means at an equal number of spatially separated sensor locations;
spectral analysis means for transforming said complex voltage temporal functions to doppler frequency functions V(w) which vary with a doppler frequency (w) induced in said complex voltage temporal functions V(t) as a result of a change in path length between said trasmitter means, said targets and said sensor means;
means for generating spectral phase functions $\phi(w)$ and amplitude functions A(w) from said doppler frequency functions V(w) indicating a plurality of scattering points;
means for comparing said scattering points with a predetermined threshold value to identify and distinguish said plurality of targets from noise;
means for locating said plurality of targets comprising:
means for generating phase difference functions $\Delta\phi(w)$ from the difference between said phase values $\phi(w)$ for a plurality of pairs of said independent sensors;
means for comparing said phase difference functions $\Delta\phi(w)$ at corresponding doppler frequencies;

means for analyzing said phase difference functions $\Delta\phi(w)$ as a function of spatial separation of said plurality of pairs of said independent sensors using interferometry techniques to determine the angular location of each target relative to said independent sensors.

29. The system of claim 28 wherein said means for locating further comprises:
means for sorting said doppler frequency functions by amplitude to selectively examine targets having predetermined characteristics.

30. The system of claim 28 further comprising:
means for determining radial velocity of movement of said targets from said doppler frequency (w).

31. The system of claim 28 wherein said means for analyzing comprises:
interferometry means for calculating a zenith angle $\theta$ indicative of the angular location of said targets relative to said transducer means as follows:

$$\theta = \sin^{-1}\left(\frac{\lambda\Delta\phi}{2\pi D}\right)$$

where
$\Delta\phi$ = the difference in phase values of said phase functions $\phi(w)$ produced by said transducer means having a spatial separation (D).
$\lambda$ = the wavelength of said temporal series of pulses.

32. The system of claim 28 wherein said means for analyzing comprises:
phase fitting means for examining said spectral phase functions $\phi(w)$ for each doppler spectral frequency to determine if said differences in said phase values vary substantially linearly with said spatial separation (D) of said spatially separated sensor locations;
interferometry means for calculating a zenith angle of each target distinguished from noise by said phase fitting means.

33. The system of claim 32 wherein said phase fitting means comprises:
means for eliminating $2\pi$ discontinuities from said phase values by comparing said phase values with all possible displacement patterns capable of producing a linear response;
means for fitting a linear response to said phase values;
means for calculating if the root mean square error of said linear response is less than a predetermined error limit.

34. The system of claim 33 wherein said error limit is approximately 15 degrees.

35. The system of claim 33 wherein said means for locating further comprises:
means for detecting said spectral amplitude functions A(w) produced at spatially separated sensor locations to determine a minimum threshold value indicating the existence of said possible target for a specified doppler frequency.

36. The system of claim 28 further comprising:
synthetic beam translation means for sequentially scanning said sensor means to induce said change in path length defined by said transmitter means, said targets and said sensor means to produce said doppler frequency (w) in said complex voltage temporal functions V(t) for targets which are stationary relative to said sensor means.

37. The system of claim 28 further comprising:
synthetic beam translation means for sequentially scanning said transmitter means to induce said change in path length defined by said transmitter means, said targets and said transmitter means to produce said doppler frequency (w) in said complex voltage temporal functions V(t) for targets which are stationary relative to said transmitter means.

38. The system of claim 28 further comprising:
means for measuring the time of flight of said temporal series of pulses reflected from said targets to provide range gate information of the radial distance (R) of said targets from said sensor means.

39. The system of claim 38 further comprising:
means for generating an additional temporal series of pulses for transmission by said transmitter means having a frequency which differs slightly from said temporal series of pulses;
means for comparing said phase values $\phi(w)$ of said temporal series of pulses and said additional temporal series of pulses;
means for determining said radial distance of said targets within said range gate by examining the difference in said phase values $\phi(w)$ of said temporal series of pulses and said additional temporal series of pulses.

40. The system of claim 28 wherein said temporal series of pulses comprise vibrational pulses.

41. The system of claim 28 wherein said temporal series of pulses comprise sound pulses.

42. The system of claim 28 wherein said temporal series of pulses comprise electromagnetic radiation pulses.

43. The system of claim 42 wherein said temporal series of pulses comprise radar pulses.

44. The system of claim 42 wherein said temporal series of pulses comprises laser pulses.

45. The system of claim 28 wherein said transmitter means and said sensor means comprises an antenna array for transmitting and receiving electromagnetic radiation.

46. The system of claim 45 wherein said antenna array comprises:
at least three antennas aligned in at least two directions and spatially separated by less than the distance of $\frac{1}{2}$ wavelength of said temporal series of pulses for providing data to unambiguously locate said targets;
at least two additional antennas aligned in each of said two directions and spatially separated from said antennas by a distance which is a plurality of wavelengths of said temporal series of pulses for providing high resolution zenith angle determinations.

47. The process for providing locational information of a plurality of targets comprising the steps of:
detecting temporal pulses received from said plurality of targets substantially simultaneously by at least three independent sensors;
producing complex voltage temporal functions V(t) separately for each of said independent sensors;
separately transforming each of said complex voltage temporal functions V(t) to doppler frequency functions V(w) which vary with a separate doppler frequency (w) of each target of said plurality of targets said separate doppler frequency of each target generated as a result of an independent velocity of each target relative to said independent sensors and independent of velocity of other targets of said plurality of targets;

generating amplitude values $A(w)$ and phase values $\phi(w)$ from said doppler frequency functions $V(w)$ indicating a plurality of scattering points;

comparing said scattering points with a predetermined threshold value to identify and distinguish said plurality of targets from noise;

locating said plurality of targets by the following steps:

generating phase difference functions $\Delta\phi(w)$ from the difference between said phase values $\phi(w)$ for a plurality of pairs of said independent sensors;

comparing said phase difference functions $\Delta\phi(w)$ at corresponding doppler frequencies;

analyzing said phase difference functions $\Delta\phi(w)$ as a function of spatial separation of said plurality of pairs of said independent sensors using interferometry techniques to determine the angular location of each target relative to said independent sensors.

* * * * *